(12) United States Patent
Healey et al.

(10) Patent No.: US 11,743,104 B2
(45) Date of Patent: Aug. 29, 2023

(54) SYSTEMS AND METHODS FOR AUTOMATICALLY GENERATING A DATA CENTER NETWORK MAPPING FOR AUTOMATED ALARM CONSOLIDATION

(71) Applicant: SCHNEIDER ELECTRIC IT CORPORATION, Foxboro, MA (US)

(72) Inventors: Christopher M. Healey, N. Andover, MA (US); Anna Lake, N. Cambridge, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 17/653,321

(22) Filed: Mar. 3, 2022

(65) Prior Publication Data

US 2022/0239548 A1  Jul. 28, 2022

Related U.S. Application Data

(63) Continuation of application No. 16/597,577, filed on Oct. 9, 2019, now Pat. No. 11,271,794.

(60) Provisional application No. 62/743,986, filed on Oct. 10, 2018.

(30) Foreign Application Priority Data

Oct. 7, 2019  (EP) .................... 19201671

(51) Int. Cl.
*H04L 41/06* (2022.01)
*H04L 41/12* (2022.01)

(52) U.S. Cl.
CPC .............. *H04L 41/06* (2013.01); *H04L 41/12* (2013.01)

(58) Field of Classification Search
None
See application file for complete search history.

(56) References Cited

U.S. PATENT DOCUMENTS

| | | |
|---|---|---|
| 10,148,489 B2 | 12/2018 | Wu et al. |
| 2007/0163748 A1 | 7/2007 | Rasmussen et al. |
| 2010/0052924 A1 | 3/2010 | Bajpay et al. |
| 2011/0187488 A1 | 8/2011 | Fiske et al. |
| 2014/0195199 A1 | 7/2014 | Uluyol |

(Continued)

OTHER PUBLICATIONS

Extended European Search Report from corresponding European Application No. 19201671.5 dated Feb. 28, 2020.

*Primary Examiner* — Angela Nguyen
(74) *Attorney, Agent, or Firm* — Lando & Anastasi, LLP

(57) ABSTRACT

According to at least one aspect of the present invention, a system for automatically generating a data-center network mapping for automated alarm consolidation is provided comprising a plurality of devices, and at least one computing device communicatively coupled to each of the devices, the at least one computing device being configured to receive operational data from each of the devices, the operational data being indicative of at least one of a power path, cooling or temperature zones, or communications paths, determine, based on the operational data, device relationships between each of the devices, receive, from each of the devices, a respective alarm of a plurality of alarms, determine alarm relationships between at least two of the plurality of alarms, consolidate, based on the determined device relationships and based on the determined alarm relationships, the plurality of alarms into a consolidated alert, and provide the consolidated alert to a user.

20 Claims, 15 Drawing Sheets

(56) References Cited

U.S. PATENT DOCUMENTS

2015/0280968 A1 10/2015 Gates et al.
2015/0280969 A1 10/2015 Gates et al.
2015/0355959 A1 12/2015 Kogan-Kalz et al.
2019/0013007 A1 1/2019 Boxwell et al.

SYSTEMS AND METHODS FOR AUTOMATICALLY GENERATING A DATA CENTER NETWORK MAPPING FOR AUTOMATED ALARM CONSOLIDATION

CROSS-REFERENCE TO RELATED APPLICATION

This application is a Continuation of U.S. application Ser. No. 16/597,577, titled SYSTEMS AND METHODS FOR AUTOMATICALLY GENERATING A DATA CENTER NETWORK MAPPING FOR AUTOMATED ALARM CONSOLIDATION, filed on Oct. 9, 2019, which claims priority under 35 U.S.C. § 119(e) to U.S. Provisional Application Ser. No. 62/743,986, titled NETWORK INFERENCE FOR SYSTEM AVAILABILITY IN DATA CENTERS AND APPLICATIONS, filed on Oct. 10, 2018, and claims priority under 35 U.S.C. § 119 to European Application No. EP 19201671.5, titled SYSTEMS AND METHODS FOR AUTOMATICALLY GENERATING A DATA CENTER NETWORK MAPPING FOR AUTOMATED ALARM CONSOLIDATION, filed on Oct. 7, 2019, each of which is hereby incorporated by reference in its entirety.

BACKGROUND OF THE INVENTION

1. Field of the Invention

At least one example in accordance with the present invention relates generally to monitoring devices and determining relationships between devices in data centers.

2. Discussion of Related Art

It is known to provide a data center having multiple interconnected devices, including uninterruptible power supplies, power distribution units, rack power distribution units, and so forth. Devices may be related by one of several parameters, including power, temperature, and communicability. For example, certain devices within the data center may be related by a shared power path, and may be unrelated to other devices within the data center which do not share a power path with the devices under consideration.

SUMMARY

According to at least one aspect of the present invention, a system is provided comprising a plurality of interrelated devices, and at least one computing device communicatively coupled to each device of the plurality of interrelated devices, the at least one computing device being configured to receive data from each device of a plurality of interrelated devices, determine, based on the received data, device relationships between each device of the plurality of interrelated devices, receive, from each device of the plurality of devices, a respective alarm of a plurality of alarms, determine, based on the plurality of alarms, relationships between at least two alarms of the plurality of alarms, consolidate, based on the determined device relationships and based on the relationships between the at least two alarms, the plurality of alarms into a consolidated alert, and provide the consolidated alert to a user.

In one embodiment, the device relationships are based on at least one of a power path, cooling or temperature zones, and communications paths. In an embodiment, the plurality of interrelated devices includes a power device, and wherein the data includes at least one of current data representing a current provided by the power device, power data representing a power provided by the power device, and voltage data representing a voltage provided by the power device. In an embodiment, the at least one computing device is further configured, in determining the device relationships, to normalize the data with respect to a single polling frequency.

In at least one embodiment, the at least one computing device is further configured, in normalizing the data with respect to a single polling frequency, to round data measurements to a nearest period of the single polling frequency, and interpolate data measurements for each period of the single polling frequency for which no data measurement exists. In one embodiment, the at least one computing device is further configured, in determining the device relationships, to execute at least one of a Bayesian network estimation technique, a correlation coefficient technique, a restricted regression optimization technique, and an ordinary least squares technique to generate a device mapping indicative of relationships between each device of the plurality of devices.

In embodiments, the at least one computing device is further configured, in determining the relationships, to generate a first subset of alarms of the plurality of alarms, the first subset of alarms being received within a first time from the plurality of devices, and generate a second subset of alarms of the plurality of alarms, the second subset of alarms being received within a second time from the plurality of devices, and the first time being different than the second time. In an embodiment, the at least one computing device is further configured, in determining the relationships, to determine a plurality of association rules, the plurality of association rules indicating a relationship between the first subset of alarms and the second subset of alarms.

In one embodiment, the at least one computing device is further configured, in determining the relationships, to evaluate the plurality of association rules to determine an association rule of the plurality of the association rules which has a highest likelihood of representing a relationship between the first subset of alarms and the second subset of alarms. In an embodiment, the at least one computing device is further configured, in determining the relationships, to present the association rule to the user, and receive, from the user, a label for the association rule.

According to one aspect of the invention, a method is provided comprising acts of receiving, from each device of a plurality of interrelated devices, data, determining, based on the received data, device relationships between each device of the plurality of devices, receiving, from each device of the plurality of devices, a respective alarm of a plurality of alarms, determining, based on the plurality of alarms, relationships between at least two alarms of the plurality of alarms, consolidating, based on the determined device relationships and based on the relationships between the at least two alarms, the plurality of alarms into a consolidated alert, and providing the consolidated alert to a user.

In one embodiment, the device relationships are based on at least one of a power path, cooling or temperature zones, and communications paths. In an embodiment, the data includes at least one of current data representing a current provided by a power device of the plurality of devices, power data representing a power provided by the power device, and voltage data representing a voltage provided by the power device. In embodiments, determining the device relationships includes normalizing the data with respect to a single polling frequency. In some embodiments, normalizing the data with respect to a single polling frequency includes rounding data measurements to a nearest period of the single polling frequency, and interpolating data measurements for each period of the single polling frequency for which no data measurement exists.

In an embodiment, determining the device relationships further includes executing at least one of a Bayesian network estimation technique, a correlation coefficient technique, an ordinary least squares technique, and a restricted regression optimization technique to generate a device mapping indicative of relationships between each device of the plurality of devices. In an embodiment, determining the relationships includes generating a first subset of alarms of the plurality of alarms, the first subset of alarms being received within a first time from the plurality of devices, and includes generating a second subset of alarms of the plurality of alarms, the second subset of alarms being received within a second time from the plurality of devices, and the first time being different than the second time.

In one embodiment, determining the relationships further includes determining a plurality of association rules, the plurality of association rules indicating a relationship between the first subset of alarms and the second subset of alarms. In some embodiments, determining the relationships further includes evaluating the plurality of association rules to determine an association rule of the plurality of the association rules which has a highest likelihood of representing a relationship between the first subset of alarms and the second subset of alarms. In an embodiment, determining the relationships further includes presenting the association rule to the user, and receiving, from the user, a label for the association rule.

According to one aspect, a system for automatically generating a data-center network mapping for automated alarm consolidation is provided comprising a plurality of interrelated devices, and at least one computing device communicatively coupled to each device of the plurality of interrelated devices, the at least one computing device being configured to receive operational data from each device of the plurality of interrelated devices, the operational data being indicative of at least one of a power path, cooling or temperature zones, or communications paths, determine, based on the operational data, device relationships between each device of the plurality of interrelated devices, receive, from each device of the plurality of interrelated devices, a respective alarm of a plurality of alarms, determine, based on the plurality of alarms, alarm relationships between at least two alarms of the plurality of alarms, consolidate, based on the determined device relationships and based on the determined alarm relationships, the plurality of alarms into a consolidated alert, and provide the consolidated alert to a user.

In one example, the plurality of interrelated devices includes a power device, and wherein the operational data includes at least one of current data representing a current provided by the power device, power data representing a power provided by the power device, or voltage data representing a voltage provided by the power device, or temperature data representing an ambient temperature of the power device provided by the power device. In some examples, the at least one computing device is further configured, in determining the device relationships, to standardize the operational data with respect to a single polling frequency. In at least one example, the at least one computing device is further configured, in standardizing the operational data with respect to the single polling frequency, to round data measurements to a nearest period of the single polling frequency, and interpolate data measurements for each period of the single polling frequency for which no data measurement exists.

In some examples, the at least one computing device is further configured, in determining the device relationships, to execute at least one of a Bayesian network estimation technique, a correlation coefficient technique, a restricted regression optimization technique, or an ordinary least squares technique to generate a device mapping indicative of relationships between each device of the plurality of interrelated devices. In at least one example, the at least one computing device is further configured, in determining the alarm relationships, to generate a first subset of alarms of the plurality of alarms, the first subset of alarms being received within a first time from the plurality of interrelated devices, and generate a second subset of alarms of the plurality of alarms, the second subset of alarms being received within a second time from the plurality of interrelated devices, and the first time being different than the second time.

In an example, the at least one computing device is further configured, in determining the alarm relationships, to determine a plurality of association rules, the plurality of association rules indicating a relationship between the first subset of alarms and the second subset of alarms. In various examples, the at least one computing device is further configured, in determining the alarm relationships, to evaluate the plurality of association rules to determine an association rule of the plurality of the association rules which has a highest likelihood of representing a relationship between the first subset of alarms and the second subset of alarms. In at least one example, the at least one computing device is further configured, in determining the alarm relationships, to present the association rule to the user, and receive, from the user, a label for the association rule.

According to an aspect, a non-transitory computer-readable medium storing thereon sequences of computer-executable instructions for automatically generating a data-center network mapping for automated alarm consolidation is provided, the sequences of computer-executable instructions including instructions that instruct at least one processor to receive, from each device of a plurality of interrelated devices, operational data indicative of at least one of a power path, cooling or temperature zones, or communications paths, determine, based on the operational data, device relationships between each device of the plurality of interrelated devices, receive, from each device of the plurality of interrelated devices, a respective alarm of a plurality of alarms, determine, based on the plurality of alarms, alarm relationships between at least two alarms of the plurality of alarms, consolidate, based on the determined device relationships and based on the determined alarm relationships, the plurality of alarms into a consolidated alert, and provide the consolidated alert to a user.

In various examples, the operational data includes at least one of current data representing a current provided by a power device of the plurality of interrelated devices, power data representing a power provided by the power device, or voltage data representing a voltage provided by the power device, or temperature data representing an ambient temperature of the power device provided by the power device. In at least one example, determining the device relationships includes standardizing the operational data with respect to a single polling frequency. In some examples, standardizing the operational data with respect to a single polling frequency includes rounding data measurements to a nearest period of the single polling frequency, and interpolating data measurements for each period of the single polling frequency for which no data measurement exists.

In various examples, determining the device relationships further includes executing at least one of a Bayesian network estimation technique, a correlation coefficient technique, an ordinary least squares technique, or a restricted regression optimization technique to generate a device mapping indicative of relationships between each device of the plurality of interrelated devices. In some examples, determining the alarm relationships includes generating a first subset of alarms of the plurality of alarms, the first subset of alarms being received within a first time from the plurality of interrelated devices, and includes generating a second subset of alarms of the plurality of alarms, the second subset of alarms being received within a second time from the plurality of interrelated devices, and the first time being different than the second time.

In at least one example, determining the alarm relationships further includes determining a plurality of association rules, the plurality of association rules indicating a relationship between the first subset of alarms and the second subset of alarms. In some examples, determining the alarm relationships further includes evaluating the plurality of association rules to determine an association rule of the plurality of the association rules which has a highest likelihood of representing a relationship between the first subset of alarms and the second subset of alarms. In an example, determining the alarm relationships further includes presenting the association rule to the user, and receiving, from the user, a label for the association rule.

According to aspects of the disclosure, a method of automatically generating a data-center network mapping for automated alarm consolidation is provided comprising receiving, from each device of a plurality of interrelated devices, operational data indicative of at least one of a power path, cooling or temperature zones, or communications paths, determining, based on the operational data, device relationships between each device of the plurality of interrelated devices, receiving, from each device of the plurality of interrelated devices, a respective alarm of a plurality of alarms, determining, based on the plurality of alarms, alarm relationships between at least two alarms of the plurality of alarms, consolidating, based on the determined device relationships and based on the determined alarm relationships, the plurality of alarms into a consolidated alert, and providing the consolidated alert to a user.

According to aspects of the disclosure, a system for automatically generating a data-center network mapping is provided comprising a plurality of interrelated devices, and at least one computing device communicatively coupled to each device of the plurality of interrelated devices, the at least one computing device being configured to receive, from each device of the plurality of interrelated devices, operational data indicative of at least one of a power path, cooling or temperature zones, or communications paths, determine, based on the operational data, a statistical probability of a connection based on at least one of the power path, cooling or temperature zones, or communications paths between each pair of devices of the plurality of interrelated devices, generate, based on the operational data, a device mapping indicative of at least one predicted connection between at least one pair of devices of the plurality of interrelated devices, and provide the device mapping to a user.

In some examples, the plurality of interrelated devices includes a power device, and wherein the operational data includes at least one of current data representing a current provided by or to the power device, power data representing a power provided by or to the power device, or voltage data representing a voltage provided by or to the power device, or temperature data representing an ambient temperature of the power device provided by the power device. In various examples, the at least one computing device is further configured to standardize the operational data with respect to a single polling frequency.

In at least one example, the at least one computing device is further configured, in standardizing the operational data with respect to the single polling frequency, to round data measurements to a nearest period of the single polling frequency, and interpolate data measurements for each period of the single polling frequency for which no data measurement exists. In various examples, the at least one computing device is further configured, in determining a statistical probability of the connection between each pair of devices, to execute at least one of a Bayesian network estimation technique, a correlation coefficient technique, a restricted regression optimization technique, or an ordinary least squares technique.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION OF THE INVENTION

Figure 1:
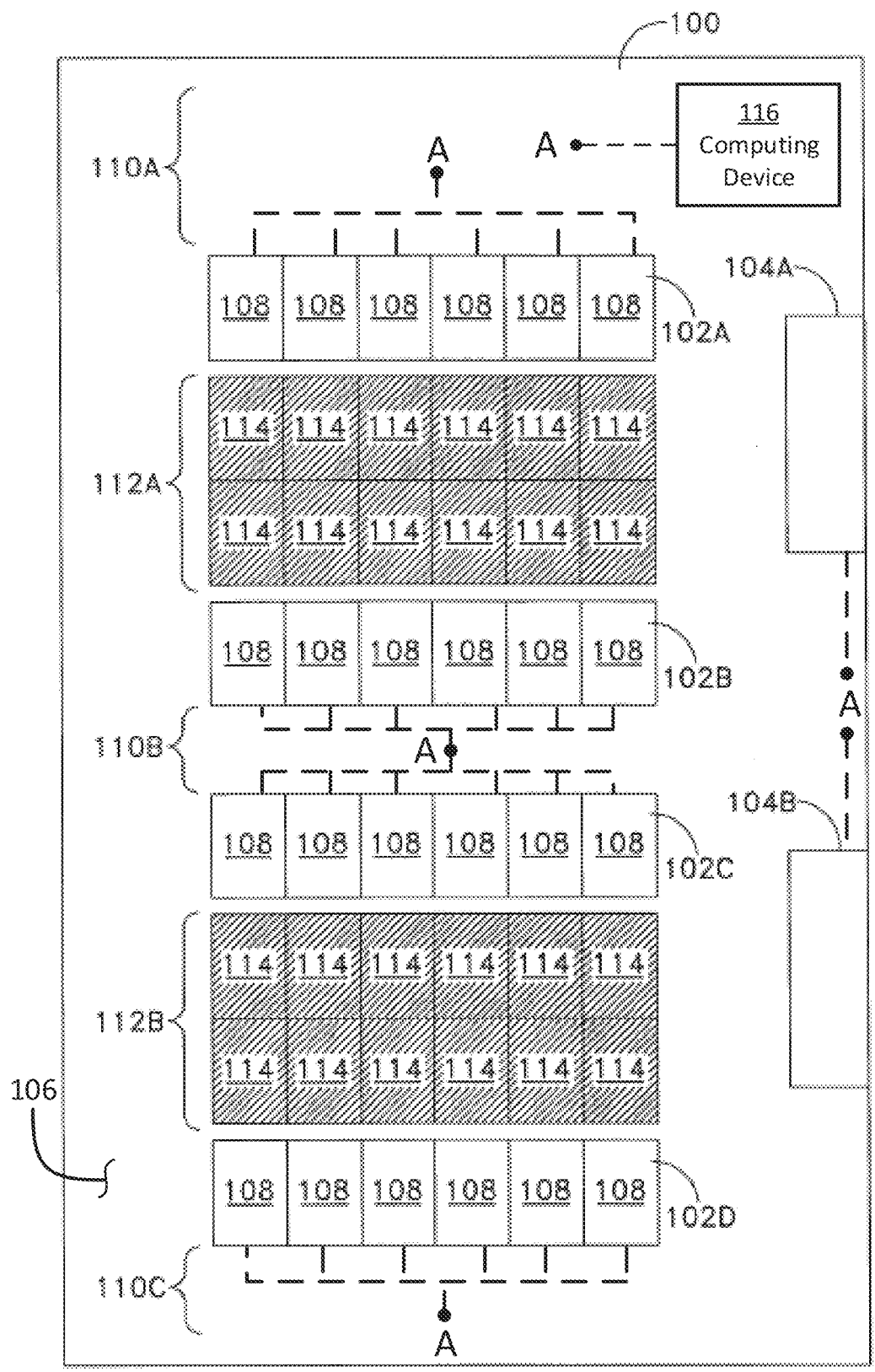
FIG. 1 illustrates a schematic diagram of a data center according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, it is known to provide a data center having multiple related devices. It may be beneficial to know a relationship between the related devices. Continuing with the foregoing example, it may be beneficial to know that the UPS is related to the rPDU in terms of the power path. For example, and as discussed in greater detail below, having information related to the relationship between devices may be beneficial in alarm filtering, determining reliability and health of the devices, determining an impact of replacing or upgrading components, determining device redundancy and capacity estimates, and for providing a basis for any implemented control schemes.

In certain conventional solutions, device relationships (for example, device relationships in a data center) are mapped manually. For example, a trained operator may physically examine devices and manually note the devices' connections by examining the physical connections (for example, via power cables) between devices. Several deficiencies exist with respect to manual mappings of device relationships. For example, manually mapping relationships may be time-consuming and may require skilled operators to perform. Furthermore, changes in device relationships are not automatically reflected in a device mapping. That is, after manually noting the connections, an operator must still take additional steps to manually update a device mapping which is only current as of the time at which the operator manually notes the connections. Manually maintained device mappings may thus not provide reliable information, because periodic manual updates are required and may not be current.

Devices may be related by one of several metrics, such as power, temperature, cooling, communications, physical location, or other metrics. For example, an uninterruptible power supply (UPS) may be related to a rack power distribution unit (rPDU) in terms of a power path (that is, an electrical connection through which power is passed) because the UPS provides uninterrupted power to the rPDU. Accordingly, embodiments are directed to analyzing operational information such as power, cooling, temperature, physical location, and/or communication information to automatically identify device relationships based on network inferences. Automatic network inferences enable device network mappings to be regularly generated with a high frequency, thereby decreasing an amount of time spent mapping device and increasing reliability of generated device mappings. Embodiments discussed herein are therefore faster, less expensive, and more reliable in providing device mappings, which enables the generated device mappings to be used with greater efficacy. Device mappings may be used for a variety of functions including, for example, alarm filtering, determining reliability and health of the devices, determining an impact of replacing or upgrading components on the operation of other components, determining device redundancy and capacity estimates, and for providing a basis for implemented control schemes.

Various examples disclosed herein are directed to devices in a data center interrelated by a power path for purposes of clarity and example only. Embodiments disclosed herein are applicable to various environments having multiple interrelated devices, and are not limited strictly to data center-based environments. As discussed above, devices may be related in terms of power, temperature, communication, physical location, or other shared parameters, and are not limited strictly to power path-based interrelations. Furthermore, as used herein, "device relationships" may refer to relationships between components and subcomponents of certain devices, such as outlets of an rPDU. Accordingly, where a UPS is coupled to an outlet of an rPDU, the UPS and the rPDU may be interrelated devices sharing a device relationship where the UPS shares a relationship with a component of the rPDU.

In one embodiment, remote network inferences are determined based on asynchronous, incomplete, and unlabeled data. For example, the data may be current or voltage data indicative of power paths interconnecting devices in a data center, where the data is determined by sensors connected to the networked devices. Various examples determine a statistical significance of tested connections by evaluating "micro" variations, "macro" system changes, and "event" data. Micro variations include variations in short-time time series data. Macro system changes include changes evident in long-term trends and data. Event data includes data indicative of electrical anomalies, semi-synchronized alarms, and so forth.

As discussed above, operational data (including, for example, power, temperature, cooling, and/or communications) may be utilized to identify relationships and connections between devices in a group of devices.

FIG. 1 illustrates a top view of a data center 100 according to an example. As appreciated by one of ordinary skill in the art, data centers, such as the data center 100, may include various computing systems (for example, servers) to store data, and may provide data center resources to support operation of the computing systems. A data center resource may include, for example, any characteristic of a data center that supports and/or ensures data center equipment functionality. Examples of data center resources include power, cooling, physical space, weight support, remote equipment control capability, physical and logical security, and physical and logical network connectivity.

Power data center resources may include power distribution resources, such as transformers, PDUs and outlets, and power available for distribution, such as utility power supplied to the data center, power generated by an onsite generator, and power supplied by UPSs. Physical space resources in a data center may include data center floor space and rack U space. Cooling resources in a data center may include cooling distribution capacity and cooling generation capacity. Physical security resources in a data center may include security cameras and door locks. Logical network connectivity resources in a data center may include virtual local area networks, domain name services, and dynamic host configuration protocol services. Physical network connectivity resources may include network cabling and patch panels. Remote equipment control capability resources in a data center may include keyboard video mouse services.

The data center 100 includes rows of cabinets 102A, 102B, 102C and 102D, cooling units 104A and 104B, and a raised floor 106. Each of the rows includes cabinets 108, which may include racks, PDUs, or other data center equipment. At least a number of the cabinets 108 may draw cool air from the front of the cabinet and return warm air to the rear and/or top of the cabinet. Each rack may contain U space positions designed to house rack-mounted data center equipment, such as servers, cooling equipment, and network connectivity equipment.

As understood by those skilled in the art, to optimize cooling performance in a data center, rows of cabinets are often positioned to create alternating cold aisles and hot aisles. In the configuration shown in FIG. 1, aisles 110A, 110B and 110C are hot aisles and aisles 112A and 112B are cold aisles. To provide cooling to the cabinets 108, in front of each of the cabinets in the cold aisle, perforated floor tiles 114 are used to provide cooling air from under the raised floor 106. In the data center 100, in addition to the perforated floor tiles shown, the raised floor 106 may include solid floor tiles.

The cooling units 104A and 104B are designed to provide cool air to the area under the raised floor 106 and to receive return warm air from the space adjacent the ceiling of the data center. In other embodiments, in addition to or in place of the cooling units 104A and 104B, in-row cooling units, such as those available from American Power Conversion Corporation, may be used. Further, in at least one embodiment, half-rack in-row cooling units may be used, as described in U.S. patent application Ser. No. 11/335,901, entitled COOLING SYSTEM AND METHOD, by Neil Rasmussen et al., filed on Jan. 19, 2006, and incorporated herein by reference. As described in the referenced application, the half-rack, in-row units have a width of twelve inches, which is approximately half that of a standard data center rack.

The data center 100 further includes a computing device 116 configured to monitor and control operation of components of the data center. For example, the computing device 116 may be communicatively coupled (for example, via wired and/or wireless connections) to each of the cabinets 108 and to the cooling units 104 as indicated by the dotted connections between the components. The dotted connections are truncated for purposes of clarity, with each dot labeled "A" representing a connection point to the computing device 116. It is to be appreciated that, although the computing device 116 is illustrated as being included in the data center 100, the computing device 116 may be either internal or external to the data center 100.

Figure 2:
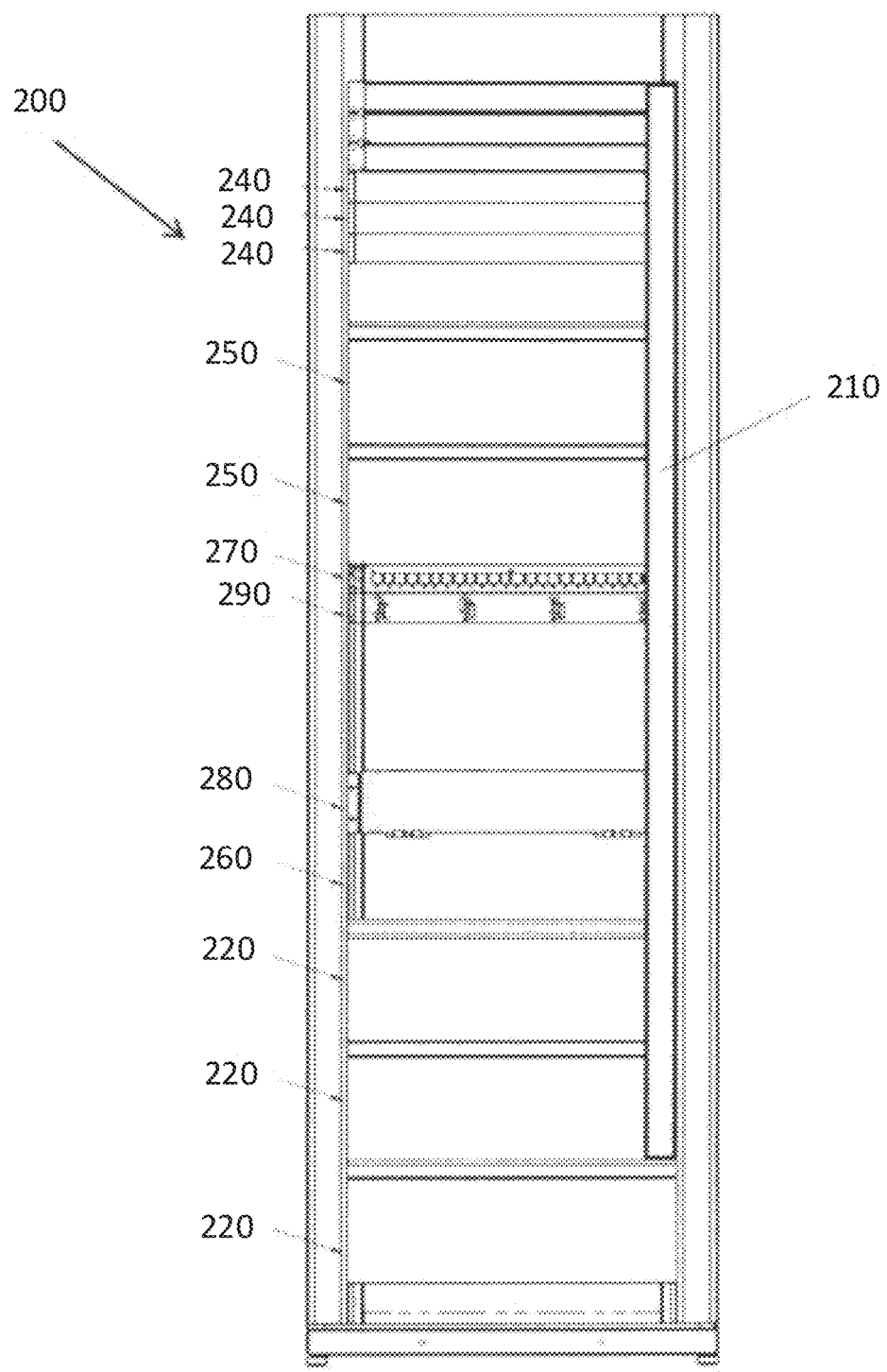
FIG. 2 illustrates a schematic diagram of an electronic device rack according to an example.

FIG. 2 illustrates a rear view of a rack 200 according to an example. For example, one or more of the cabinets 108 may be implemented as the rack 200. The doors of the rack 200 are omitted from FIG. 2 for clarity. The rack 200 may include drawer enclosures, each respectively indicated at 220, including items that support power and/or network connections for other equipment mounted in the rack 200. UPSs 240 may be installed as rack-mounted devices to increase the power supply redundancy of the rack. For example, each of the UPSs 240 may be connected to an AC power source, such as a utility power source. The UPSs 240 may, in turn, supply power derived from the AC power source to other components of the rack 200 directly, or via an rPDU 210 to which the UPS 240 provides power.

Other components of the rack 200 may include computing or network technology equipment, for example, one or more data storage devices 250, a server 260, a patch panel 270, a keyboard tray 280, a cable organizer 290, and/or a monitor or other user interface which may provide for an operator to communicate with the equipment in the rack. In some examples, the rack 200 includes a communication interface, which may be a wired or wireless interface, to communicate with other entities including, for example, one or more of the other cabinets 108, the computing device 116, or another entity. The rack 200 may be configured in any manner desired by the end user.

The rPDU 210 may be mounted internal to the rack 200. The rPDU 110 may be vertically mounted, as illustrated in FIG. 2, or may be horizontally mounted in the rack along with the other equipment in the rack. Although one rPDU 210 is shown and described, two or more rPDUs may be provided in the rack. The rPDU 210 may receive power from one or more of the UPSs 240 in the rack 200, from a PDU in the rack 200 or in another one of the cabinets 108, or directly from an AC utility supply, and may include power outlets to which power cords from the various other equipment in the rack may be electrically connected. In one example, one of the UPSs 240 may provide power to a PDU in the rack 200 or in another one of the cabinets 108, and the PDU may distribute power to the rPDU 210. Thus, it is to be appreciated that many different combinations of devices may be implemented in a power path in various examples.

The rPDU 210 may include outlets of a single type, or of varied types, configured to receive a plug of a corresponding type. As will be understood by one of ordinary skill in the art, International Electrotechnical Commission (IEC) 60320 defines a set of standards for general-purpose plug-and-outlet pairs. For example, the IEC 320-C19/C20 standard identifies an outlet and a plug, respectively, typically employed in higher-current applications, such as in providing power to a UPS.

As discussed above, at least one of the cabinets 108 may be implemented in connection with a PDU. For example, the PDU may be a stand-alone unit, rather than being implemented inside of a rack, or may be implemented inside of a rack (for example, rack-mounted). The PDU may receive electrical power directly from a utility source, for example, or may receive electrical power from a UPS. For example, a UPS implemented in connection with one of the cabinets 108, such as the UPS 240, may receive electrical power from a utility, and provide the electrical power to the PDU.

As discussed above, it may be beneficial to analyze operational data such as power, temperature, cooling, communications, and so forth, automatically identify device relationships and connections between a group of devices based on the operational data, and automatically generate a mapping indicative of the relationships and connections between the group of devices. For example, it may be beneficial to analyze operational data of devices of the data center 100, including the cabinets 108 and components thereof, such as UPSs (including, for example, the UPS 240), PDUs (including, for example, one of the cabinets 108), and rPDUs (including, for example, the rPDU 210). Utilizing power, temperature, cooling, communications, or other metrics to automatically generate a device mapping may be implemented for various purposes including, for example, alarm filtering, determining reliability and health of the devices, determining an impact of replacing or upgrading components, determining device redundancy and capacity estimates, and for providing a basis for any implemented control schemes.

Figure 3A:
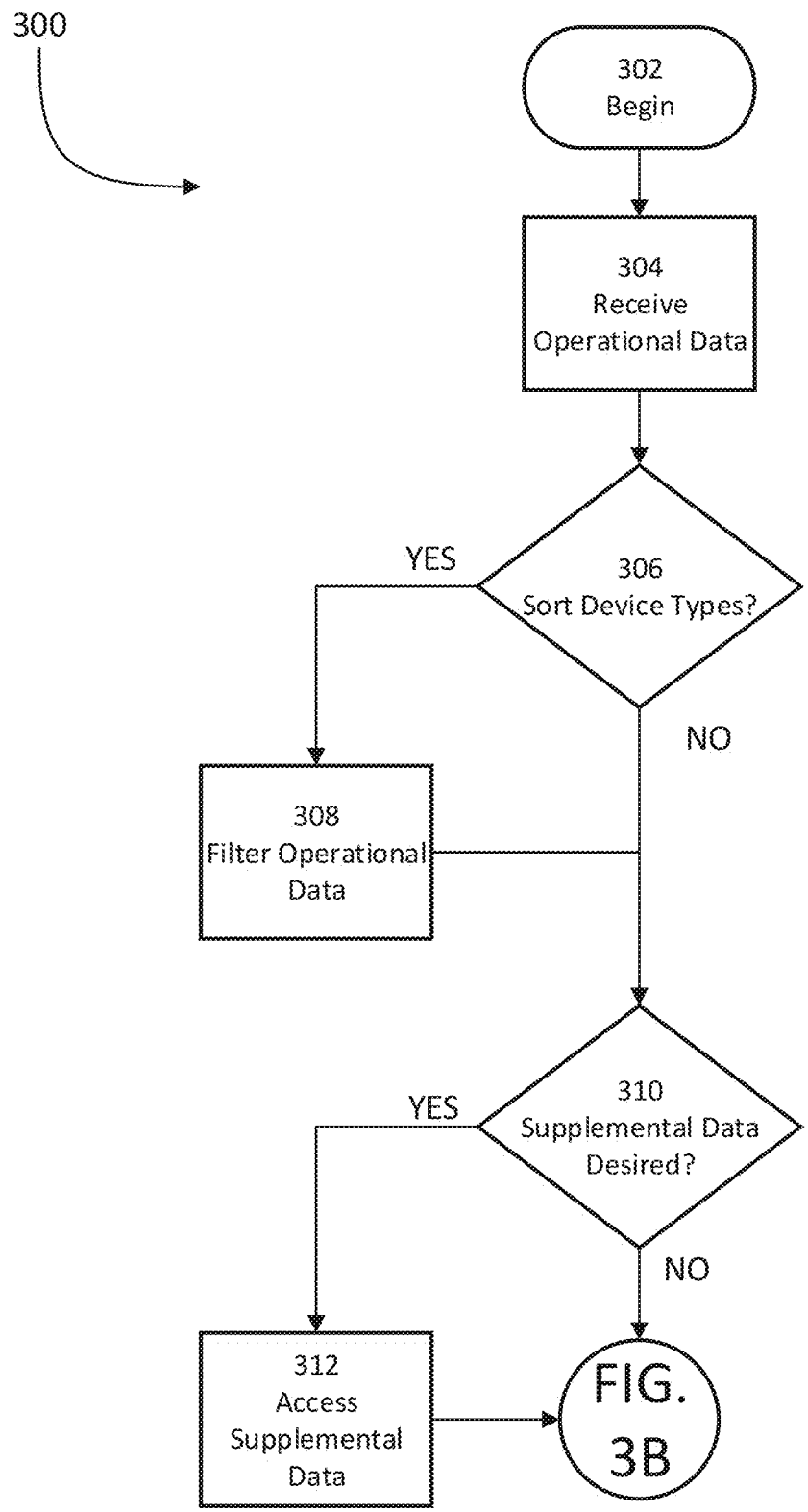
FIGS. 3A-3D illustrate a process of consolidating alarms according to an example.
Figure 3B:
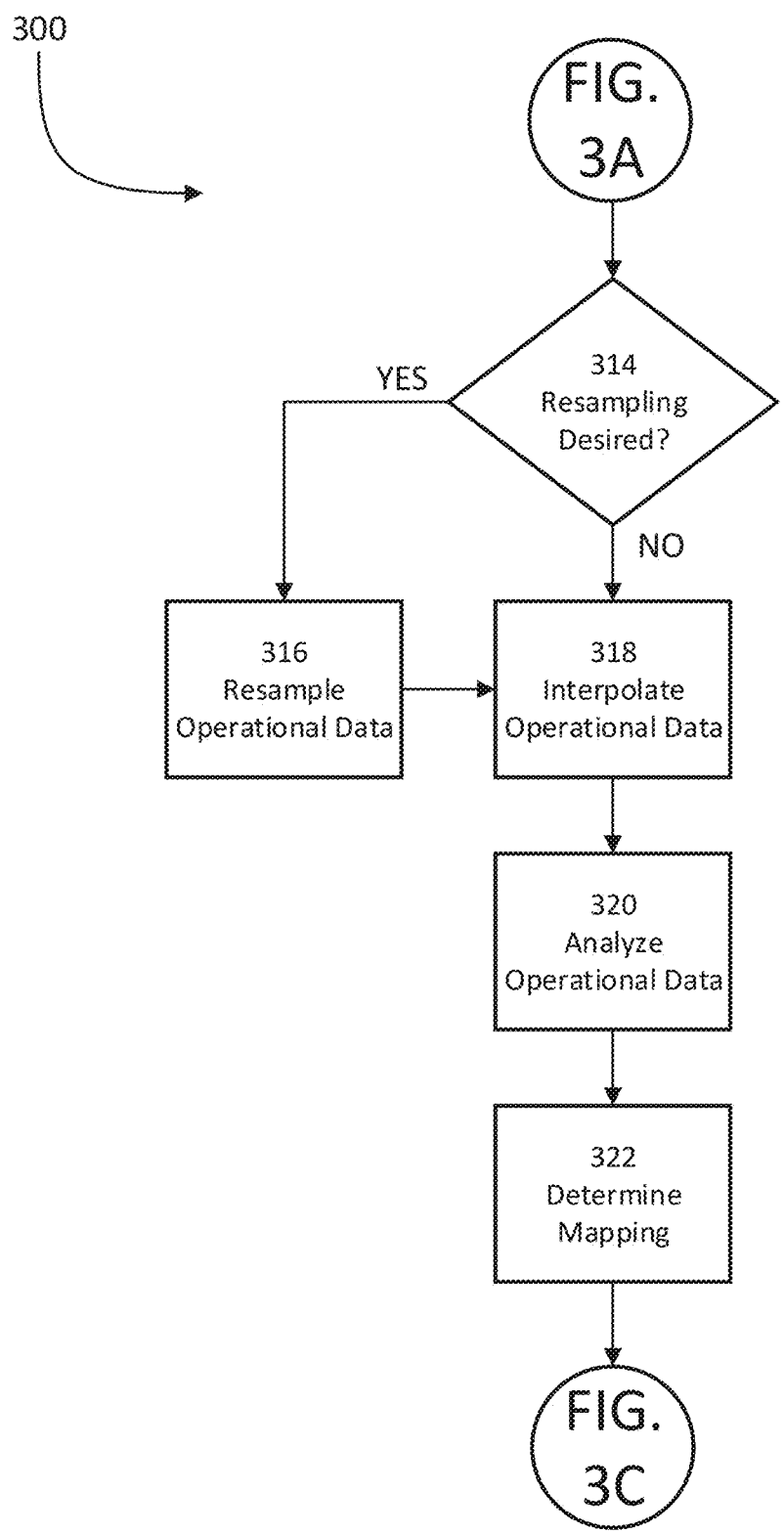
Figure 3C:
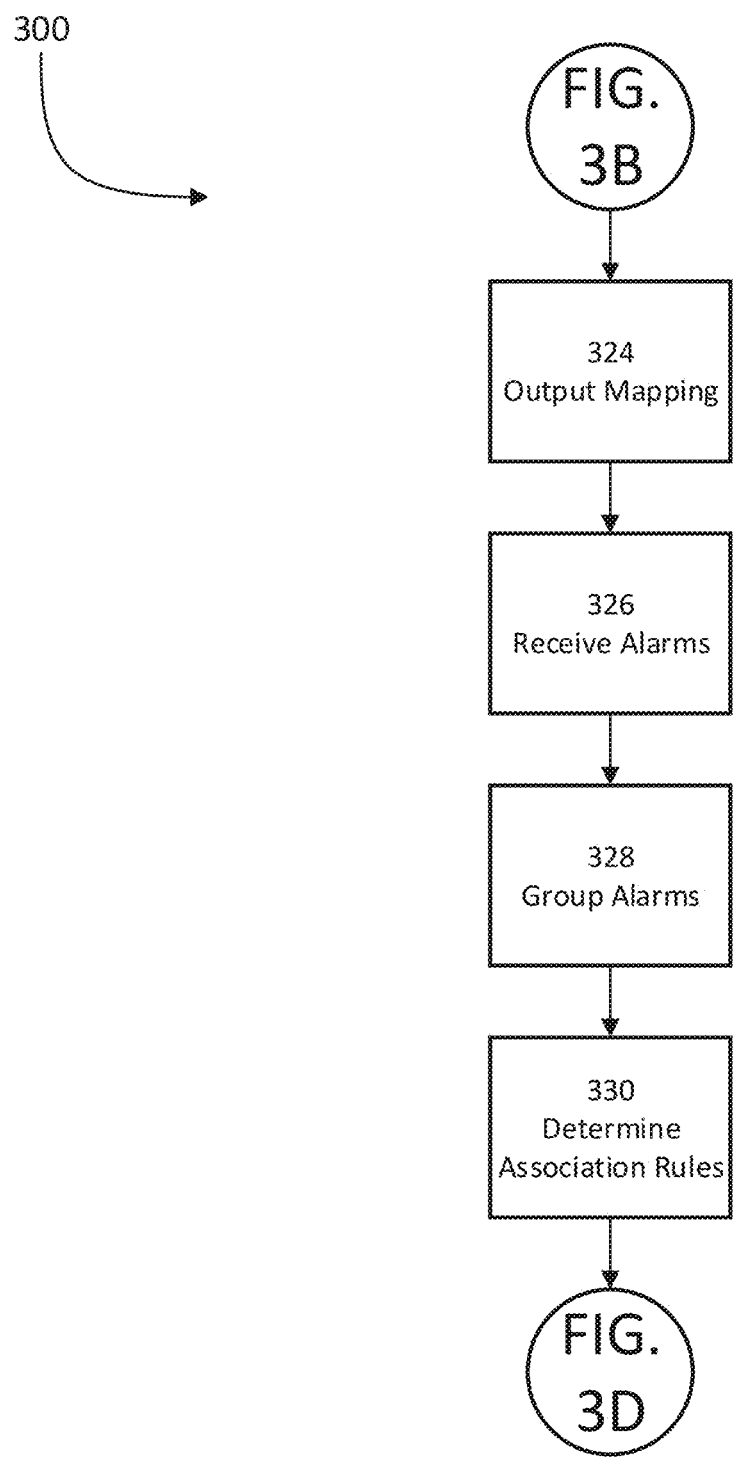
Figure 3D:
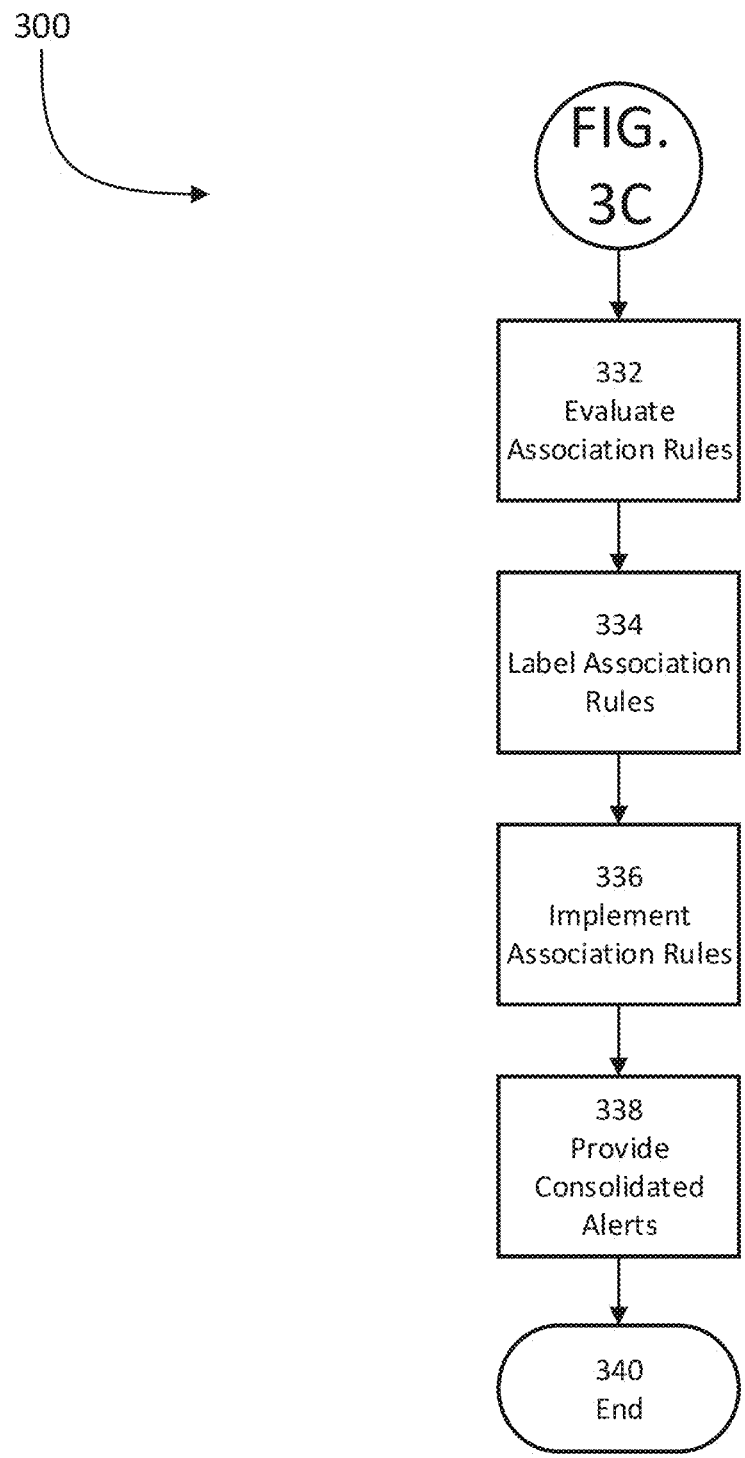

FIGS. 3A-3C illustrate a process 300 of using operational data such as electrical power, temperature, cooling information, communications, or other operational data to automatically identify device relationships and connections between a group of monitored devices and manage alarms based thereon. The process 300 may be executed by one or more computing devices communicatively coupled to one or more interrelated devices. For example, the process 300 may be executed by the computing device 116 in connection with devices including the cabinets 108 and the cooling devices 104.

At act 302, the process 300 begins. At act 304, operational data is received. For example, the data may be received by the computing device 116 from one or more communicating devices including one or more of the cabinets 108 or a component thereof, the cooling devices 104, or other devices. The operational data may be data indicative of power consumption and/or provision regarding the communicating device, ambient temperature information regarding the communicating device, cooling information regarding an amount of cooling provided to or from the communicating device, communication information regarding communications sent or received by the communicating device, or any other information pertaining to operation of the communicating device. In one example, operational data indicative of power consumption of a communicating device may include one or both of current and voltage data captured by one or more current or voltage sensors coupled to the communicating device.

In some examples, operational data received at act 304 may include or be otherwise associated with an indication of a type of the device providing the operational data. For example, where the UPS 240 is a communicating device providing power to the rPDU 210, the UPS 240 may determine, using one or more current or voltage sensors, power consumption or provision information (that is, information indicative of an amount of power provided to the rPDU 210) and communicate the power information to the computing device 116 in addition to an indication of a device type of the UPS 240. For example, the indication of the device type may at least indicate that the UPS 240 is an uninterruptible power supply, and may indicate additional details regarding the UPS 240, such as a model type or number of the UPS 240.

At act 306, a determination is made as to whether operational data is received from devices of multiple types. As discussed above, operational data may be received from devices of various types including, for example, UPSs, PDUs, rPDUs, cooling devices, and so forth. Accordingly, act 306 may include determining if operational data is received from multiple different device types. More particularly, act 306 may include analyzing the operational data to extract indications of device types and determine if any of the device types differ. If operational data is received from multiple different device types (306 YES), then the process 300 continues to act 308. Otherwise, if operational data is not received from multiple different device types (306 NO), then the process 300 continues to act 310.

At act 308, operational data is filtered based on device type. For example, operational data received from UPS s (for example, the UPS s 240) may be grouped together by the computing device 116. Grouping operational data by device type may provide various advantages. For example, it may be assumed that an rPDU is not providing output power to, or receiving input power from, another rPDU. Similarly, it may be assumed that a UPS is not providing power to another UPS. Accordingly, by sorting devices by device type, certain device relationships may be assumed invalid at the outset, such as an rPDU providing power to another rPDU.

At act 310, a determination is made as to whether supplemental data is desired by the computing device 116. Supplemental data may include any data not included in received operational data, and which may be desirable to expand on or enhance the value of received operational information. For example, operational data received from a UPS, such as the UPS 240, may indicate power consumption as a percentage of rated active power, but may not indicate an output active power in Watts nor a rated active power. Accordingly, the computing device 116 may determine that supplemental data is desirable to determine a rated active power of the UPS 240 and, using the rated active power and the percentage of rated active power, determine an output active power provided by the USP 240. If the computing device 116 determines that supplemental data is desirable (310 YES), then the process 300 continues to act 312. Otherwise, if the computing device 116 determines that supplemental data is not desirable (310 NO), then the process 300 continues to act 314.

At act 312, supplemental data is accessed. As discussed above, supplemental data may be retrieved by the computing device 116 where such supplemental data is desired. Supplemental data may be retrieved from one of several sources. Supplemental data may be stored locally by the computing device 116, or may be stored remotely from the computing device 116. For example, if an operator of the data center 100 is aware that the data center 100 will include certain models of UPS, then the operator may configure the computing device 116 to locally store information, such as a manufacturer's specification sheet, pertaining to the known models of UPS. Alternatively, in examples in which the computing device 116 determines that supplemental data that would be desirable is not stored locally, then the computing device 116 may communicate (for example, remotely via a wired or wireless connection) with an external information source storing the supplemental data, such as a database maintained by a manufacturer of a certain UPS, to retrieve the supplemental data. The supplemental data may be optionally stored for later use thereafter.

At act 314, a determination is made as to whether resampling operational data is desirable. For example, the computing device 116 may analyze the operational data received at act 304 to determine if resampling the operational data is desirable. As discussed above, data received from multiple devices may not be synchronized. For example, the devices generating the operational data may sample operational data at different times and at different frequencies. Thus, operational data received from a group of devices may not be synchronized where any differences in sampling frequencies or times exist. Accordingly, the operational data may be resampled such that the measurements are standardized to a uniform polling frequency. For example, where a uniform polling frequency is selected to be once per minute, resampling may include rounding all timestamps to a nearest minute.

In some examples, resampling may be desirable wherever operational data received from multiple devices is not entirely synchronized. In other examples, resampling may be desirable where operational data is not asynchronous beyond a certain threshold. For example, if only one device of a group of devices provides operational data that is not entirely synchronized with the other devices of the group of devices, the computing device 116 may determine that resampling is not desirable in view of the relatively minor deviation. A threshold beyond which resampling is performed may be configured by a user, or dynamically determined by the computing device 116.

If the computing device 116 determines that resampling the operational data is desirable (314 YES), then the process 300 continues to act 316. Otherwise, if the computing device 116 determines that resampling the operational data is not desirable (314 NO), then the process 300 continues to act 318. At act 316, the operational data is resampled. As discussed above, resampling the operational may include, for example, the computing device 116 rounding all timestamps to a nearest period in a selected frequency, such as a nearest minute.

At act 318, data is interpolated. As discussed above with respect to acts 314 and 316, operational data may be rounded to a uniform polling period at a selected frequency. However, certain devices' data may not have a measurement at each polling period. For example, where a device has an individual polling frequency of once per two minutes but a uniform polling frequency is selected to be once per minute, the device will only have measurements corresponding to every other one-minute uniform polling period. Accordingly, at act 318, the computing device 116 may interpolate a measurement for each timestamp for which no measurement has been taken. For example, interpolation may include estimating a measurement by duplicating a most recent measurement such that every device has a measurement for each polling period. In other examples, other interpolation methods may be used, such as averaging the nearest adjacent values, predicting a next value based on previous values, or other interpolation methods.

At act 320, the operational data is analyzed. Analyzing the pre-processed data may include executing, by the computing device 116, one or more statistical analysis technique to determine a respective statistical significance of tested connections. For example, the statistical significance may be determined by evaluating micro variations, macro variations, and event data, as discussed in greater detail below with respect to FIGS. 6 and 7.

At act 322, a device mapping is determined. Determining the device mapping may include determining, by the computing device 116 based on the analysis of the operational data at act 320, relationships amongst the devices related by, for example, power, temperature, cooling, communications, or other parameters indicated by the operational data. For example, determining a power relationship may include determining that a UPS, such as the UPS 240, provides uninterrupted power to an rPDU, such as the rPDU 210.

In some embodiments, a single method, such as those illustrated in examples discussed below, is implemented to produce the device mapping. In other embodiments, a combination of two or more methods, such as two or more statistical methods discussed below, is implemented to produce the device mapping. For example, in one embodiment, the device mapping is produced by implementing a Bayesian network estimation technique in combination with a correlation coefficient technique and a restricted regression optimization technique, as discussed below.

At act 324, the device mapping is output. For example, the computing device 116 may include a display configured to display the device mapping determined at act 322. In other examples, the computing device 116 may include a communications interface (for example, a wired or wireless communications interface) configured to provide the device mapping to a remote device. For example, the computing device 116 may provide the device mapping to a remote user device, such as a mobile phone or computer terminal, and the remote user device may be configured to display the device mapping.

The device mapping determined at act 322 may be output to a user at act 324 such that the user has useful information about device relationships. As discussed above, the device mappings may also be utilized for other opportunities, including alarm filtering, determining reliability and health of the devices, determining an impact of replacing or upgrading components, determining device redundancy and capacity estimates, and for providing a basis for any implemented control schemes.

For example, in some data center environments, such as the data center 100, alarms may include errors, warnings, or critical alerts determined to exist by a device in the data center 100. Responsive to determining the existence of an alarm, the device determining the existence of the alarm may output an alert or notification to one or more users responsible for overseeing the device. For example, where the device is a UPS such as the UPS 240, the UPS 240 may be configured to output an alarm, such as a user notification, responsive to determining that power from a grid connected to the UPS 240 is no longer available.

Although alarm notifications may be beneficial in notifying users of abnormal conditions, in some examples, users may receive redundant alarms. Redundancy may be particularly likely where a group of devices do not communicate with one another when determining when to generate alarms. For example, if a data center having many UPSs loses access to utility power, every one of the UPSs may send an alarm notification to a user responsive to each individual UPS detecting the loss of access to utility power. As discussed above, for example, the rack 200 includes multiple UPSs 240, each of which may receive utility power from a same source. If the rack 200 loses access to utility power, then each of the UPSs 240 may provide an alarm to the user, which the user may consider redundant given that a single alarm would alert the user to the fact that the rack 200 has lost access to utility power.

A user may thus find it more useful to receive a single alarm rather than many redundant alarms. For example, the user may find it more useful to receive a single notification indicating that all of the UPSs in the data center 100 or in a single one of the racks 108 have lost access to utility power due to failure of a utility grid or a failure of a utility grid connection at one of the racks 108.

Accordingly, the process 300 may enable device and alarm associations to be determined which group individual alarms into groups of similar alarms. Alarm associations may be defined by users, subject matter experts, network inferences of general population alarms, and network inferences of specific device groups (for example, devices in a single facility). Alarm notifications may be communicated to a single point, such as the computing device 116, where the alarm notifications are analyzed and consolidated, and one or more consolidated alarm notifications may be communicated to a user. Alarm consolidation may be effective in both reducing redundant alarms, and diagnosing events which triggered the alarms.

At act 326, alarms are received. Alarms may be received from devices of the data center 100 by the computing device 116. Some or all of the devices of the data center 100 may be configured to generate alarms based on monitored parameters, which may be similar or identical to parameters indicated by the operational data. The devices may include the rPDU 210, the UPSs 240, and so forth, in the data center 100, which are configured to send the alarms to the computing device 116. In one example, an alarm may be generated by the UPS 240 when the UPS 240 determines that access to utility power has been lost.

At act 328, alarms are grouped to generate subsets of alarms. The computing device 116 may group the alarms based on one or more of organization alarm information, population alarm information, and user grouping information, depending on an availability of the respective information types. Organization alarm information includes alarm information specific to an organization, such as the data center 100, and may be determined based on executing network inference techniques. Population alarm information includes alarm information which is not specific to an organization, and is instead common across different across organizations. In one embodiment, for example, UPSs activating an alarm indicative of a transition to battery power in response to a power outage is not organization-specific because most organizations' UPSs will activate alarms in a similar fashion. User grouping information includes user-defined alarm groupings.

Alarms may be grouped based on device type, and based on the alarms' occurrence within a period of time. For example, the period of time may be 15 minutes, one hour, one day, and so forth. Alarms that occur within the period of time may be grouped together because alarms occurring in close temporal proximity may be more likely to be related than alarms occurring at significantly different times.

For example, if all UPSs in the data center 100 output an alarm notification indicating a loss of grid power within a minute, it is likely that a common cause exists for the loss of grid power (for example, because of a grid power failure to the data center 100). Conversely, if two UPSs in the data center 100 determine a loss of grid power one week apart, it may be more likely that the causes of the two UPSs' loss of grid power are unrelated. In other embodiments, alarms may be grouped based on a correlation matrix of alarms using binary indicator variables during each selected time period, based on a Bayesian network construction using Bayes estimators, or based on another grouping scheme.

At act 330, association rules are determined between subsets of alarms. The computing device 116 may determine the association rules to reflect a relationship between two or more subsets of alarms. For example, a first subset of alarms may include alarms from every UPS in the data center 100 indicating that access to utility power has been lost. The first subset of alarms may thus be indicative of a grid power failure. A second subset of alarms may include alarms from PDUs and/or rPDUs, such as the rPDU 210, connected to the UPSs in the data center 100 and indicating that access to power from a UPS has been lost.

The computing device 116 may determine that an association rule exists between the first and second subsets of alarms. For example, after the grid power failure indicated by the first subset of alarms, the UPSs 240 may begin to deplete their respective backup power sources in order to provide power to the rPDU 210, thereby triggering the second subset of alarms once the backup power sources are depleted. Accordingly, the association rule may be generated to indicate that the first subset of alarms has a probability of preceding the second subset of alarms.

At act 332, the association rules are evaluated. The computing device 116 may evaluate the association rules to determine a likelihood that the association rules accurately represent an association or relationship between subsets of alarms. Evaluation may be based on at least two criteria. A first criterion includes a probability that the association rule has not occurred by chance. For example, the computing device 116 may calculate a p-value for each rule, indicating the probability of an association rule occurring by chance. A second criterion includes lift, indicating a factor of increased likelihood of a consequent subset of alarms occurring given that an antecedent subset of alarms has occurred. For example, as discussed above, an antecedent group of alarms from UPSs indicate a grid power failure which may be associated with a lift factor indicating an increased likelihood of a consequent group of alarms from PDUs indicating a loss of uninterrupted power occurring.

At act 334, association rules are labeled. Labeling the association rules may include ranking, by the computing device 116, the association rules evaluated at act 332, providing the ranked association rules to one or more users, and assigning labels to selected association rules based on input from one or more users, such as subject matter experts. In one example, unlabeled association rules are provided to the one or more users by providing visual representations of the subsets of alarms along with network sources, device information, and ranking metrics for each association rule. The one or more users may determine an appropriate label based on the provided information and label the association rules accordingly. For example, a label may be "Utility Power Failure" if the user determines, based on the visual representations, device information, and ranking metrics, that the associations indicate a utility power failure.

At act 336, labeled association rules are implemented. The computing device 116 may execute the association rules to consolidate the alarms received at act 326 and generate one or more consolidated alerts to provide to a user. At act 338, the consolidated alerts are provided to a user. For example, the computing device 116 may provide the consolidated alerts to a user via a display interface local to the computing device 116, or via a wired or wireless connection to a device accessible to one or more users, such as a mobile electronic device. At act 340, the process 300 ends.

Accordingly, a volume of alarms communicated to a user may be reduced by consolidating redundant or less-helpful alarms into user alerts. In addition to reducing a volume of alarms, the user alerts may provide additional information to users. For example, rather than a user receiving several alarms, each from a respective UPS indicating an individual lack of utility grid power, a user may receive a single alert indicating a site-wide grid power failure to a data center housing the UPSs.

Alerts may be generated based on device relationship information determined from network inferences. As discussed above, device relationship information may be determined in terms of several types of relationships, including a power path. Device relationship information may be useful because changes to a first device in a power path may affect other devices in the power path, as discussed above. Accordingly, the device relationship information determined based on network inferences aids in consolidating alarms and providing useful alerts to users.

As discussed above, however, aiding in consolidating alarms and providing useful alerts to users is only one example of benefits which may be achieved in connection with drawing network inferences. Other examples including aiding in determining a reliability and health of devices, determining an impact of replacing or upgrading components, determining redundancy and capacity estimates, mapping power systems and cooling systems, and for establishing and executing control systems, some examples of which are discussed in greater detail below.

Figure 4A:
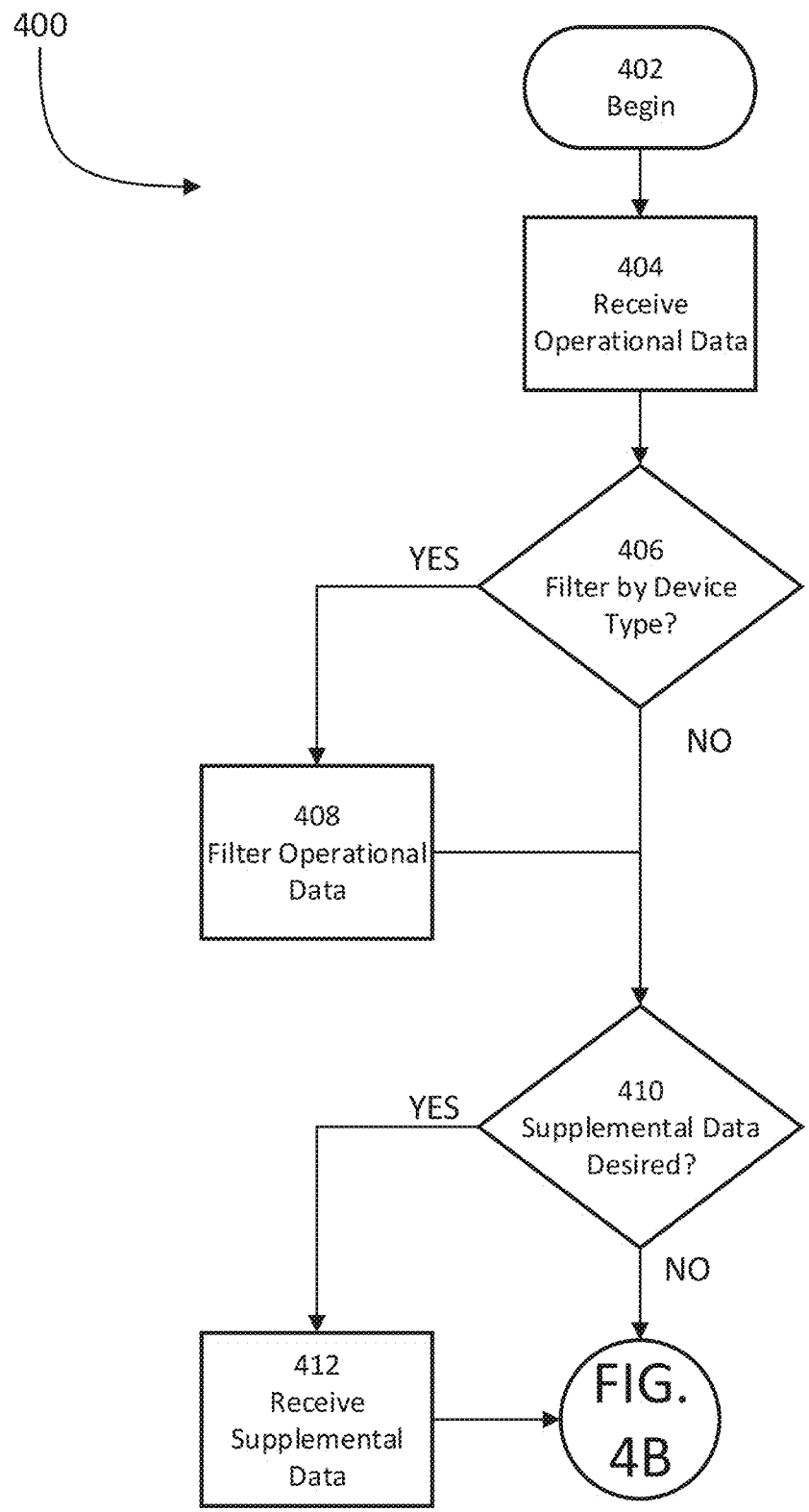
FIGS. 4A-4C illustrate a process of determining device health and reliability according to an example.
Figure 4B:
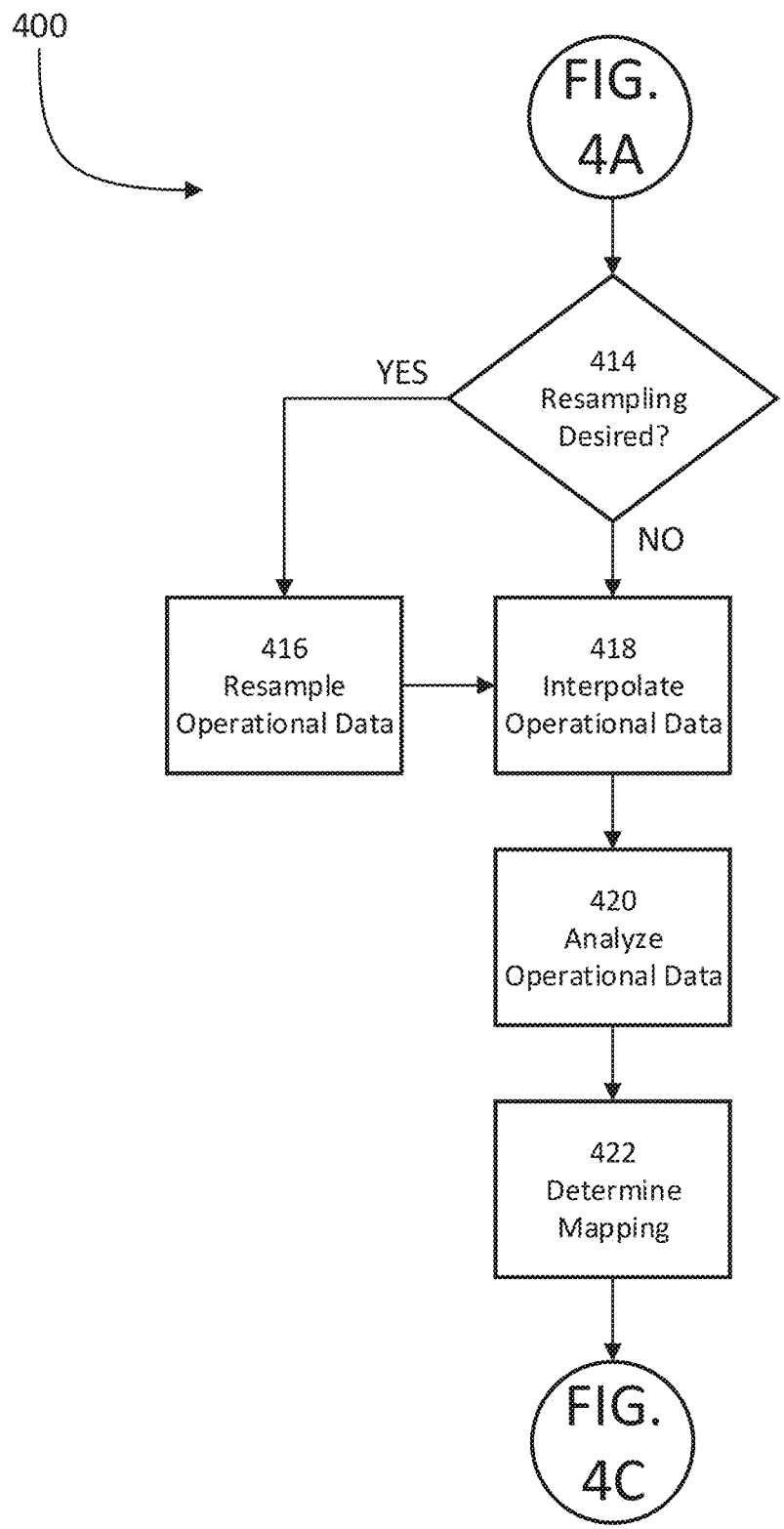
Figure 4C:
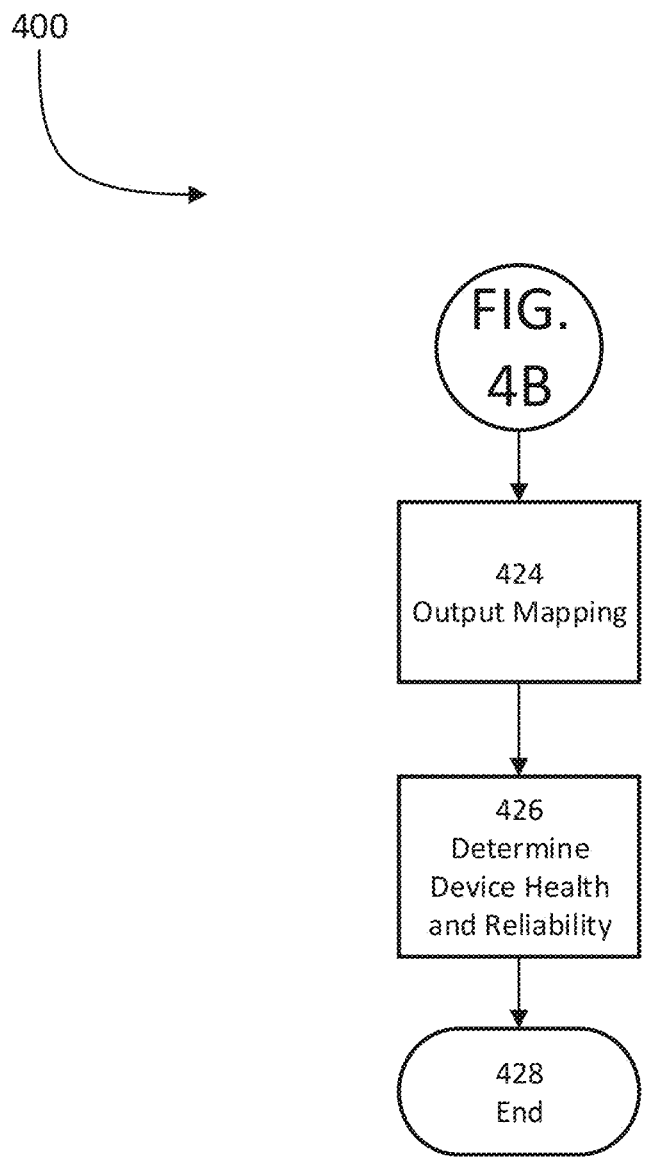

For example, FIG. 4 illustrates a process 400 of using operational data such as electrical power, temperature, cooling information, communications, or other operational data to automatically identify device relationships and connections between a group of monitored devices and determine device health and reliability based thereon. Acts 402-424 of the process 400 are substantially similar to acts 302-324 of the process 300.

At act 426, subsequent to determining and outputting a device mapping, device health and reliability may be determined. The computing device 116 may determine the device health and reliability based on the device mapping. For example, the computing device 116 may determine that a single UPS, such as the UPS 240, provides power to a large number of rPDUs including, for example, the rPDU 210. The computing device 116 may determine, based on the large number of rPDUs that the UPS powers, that the UPS is likely to fail sooner than a similar UPS providing power to a lesser number of rPDUs. Accordingly, the computing device 116 may use information regarding the number of device connections and duration of the device connections to determine a device health, and thus reliability, where a device has experienced higher levels of use than comparable UPSs. The computing device 116 may output the device health and reliability information to a user, either locally or via a wired or wireless connection to a user device. At act 428, the process 400 ends.

Figure 5A:
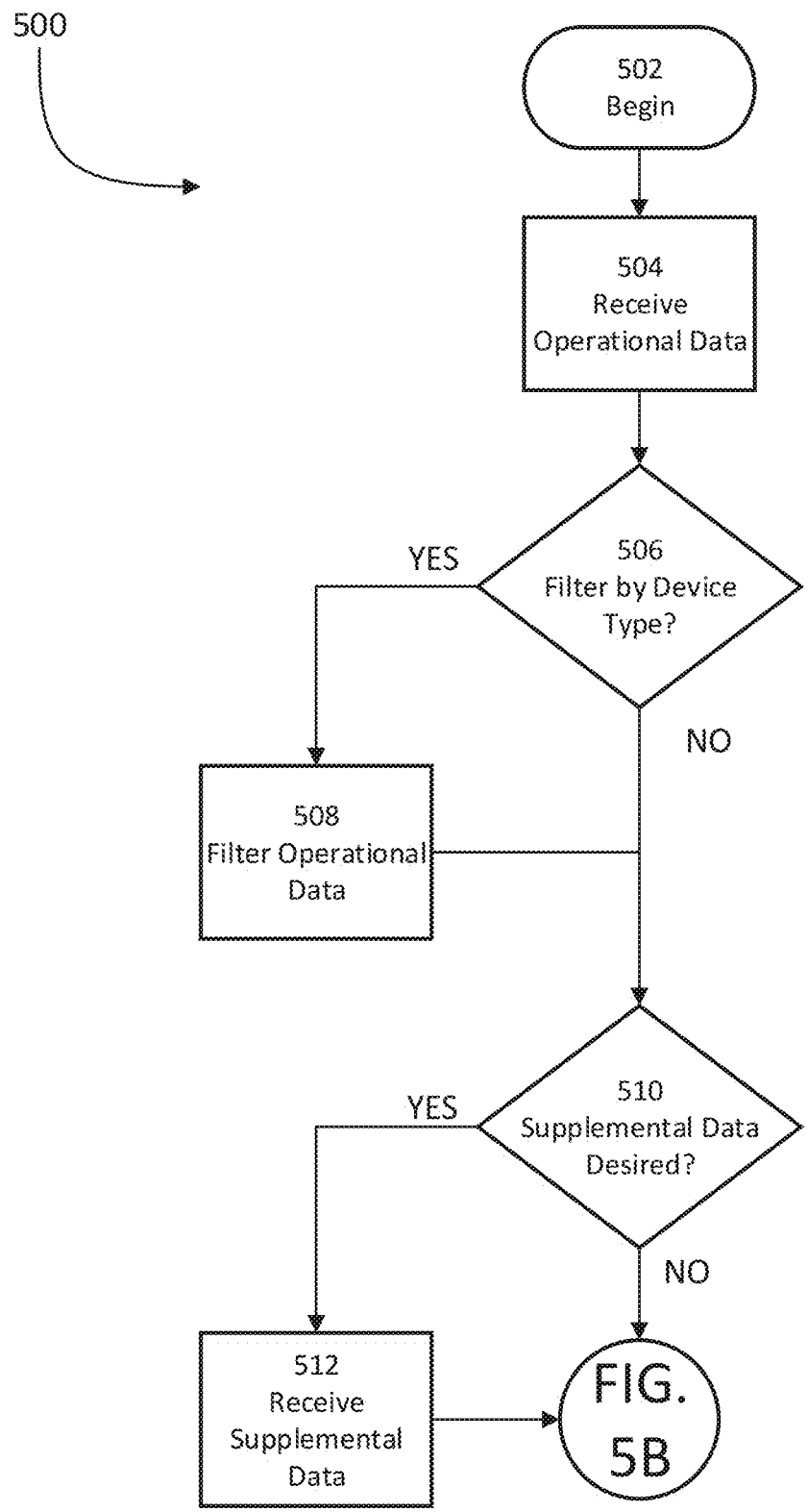
FIGS. 5A-5C illustrate a process of determining an impact of replacing and/or upgrading one or more devices according to an example.
Figure 5B:
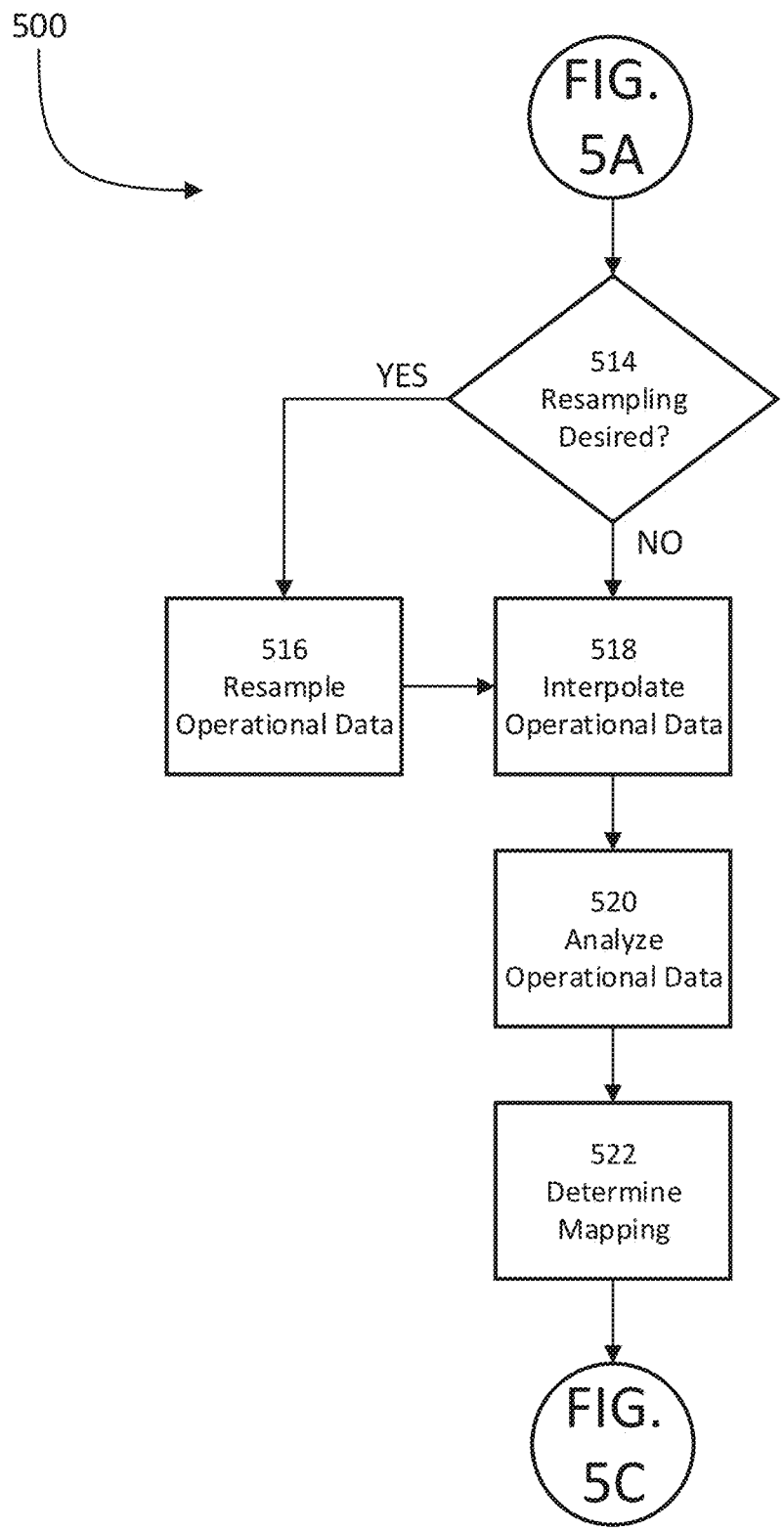
Figure 5C:
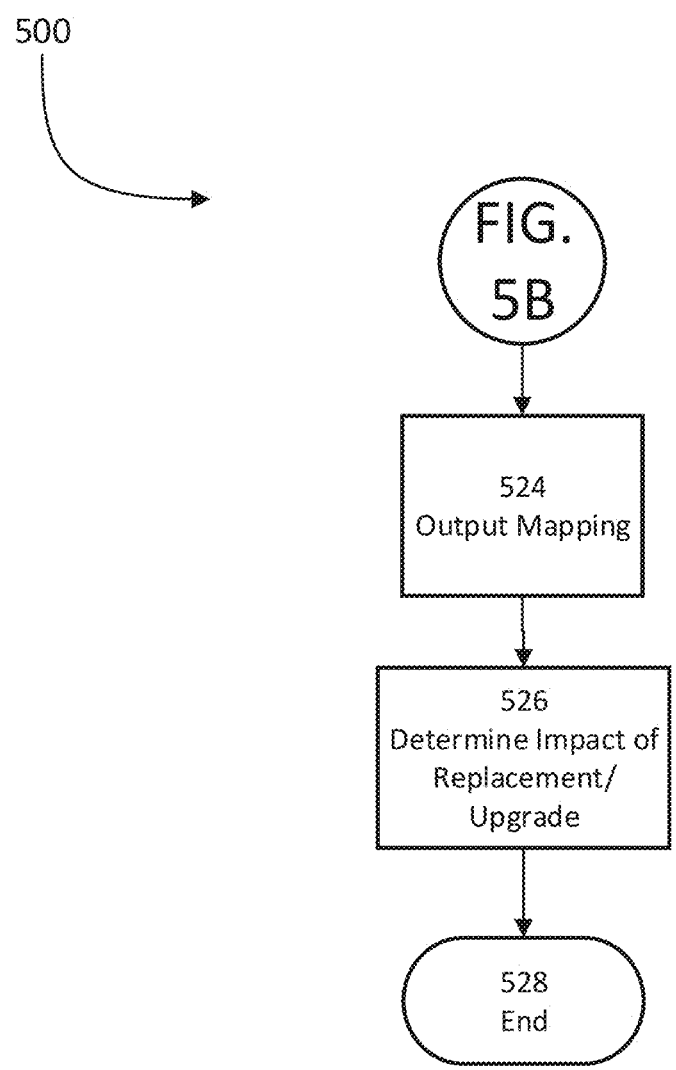

In another example, FIG. 5 illustrates a process 500 of using operational data such as electrical power, temperature, cooling information, communications, or other operational data to automatically identify device relationships and connections between a group of monitored devices and determine an impact of device replacement or upgrade based thereon. Acts 502-524 of the process 500 are substantially similar to acts 302-324 of the process 300.

At act 526, subsequent to determining and outputting a device mapping, an impact of device replacement and/or upgrade may be determined. The computing device 116 may determine the impact of such replacement and/or upgrade based on the device mapping. For example, the computing device 116 may determine that a single UPS, such as the UPS 240, provides power to several PDUs. Accordingly, the computing device 116 may determine therefrom that, if the single UPS is replaced or upgraded, PDUs powered by the UPS will temporarily lack access to power. An operator replacing or upgrading a device may therefore desire to temporarily couple the PDUs powered by the UPS to an alternate UPS during the replacement or upgrade.

Furthermore, an optimal replacement and/or upgrade scheme may be determined at act 526 based on the device mapping. For example, as discussed above with respect to act 426, device health and reliability may be determined based on a device mapping. A determination may be made based on this determination that it would be desirable to replace a low-health component with another component. In another example, a determination may be made that, because a UPS provides power to a significant number of components, the UPS should be upgraded to a higher-capacity UPS capable of supporting the significant number of components more easily. Accordingly, the computing device 116 may provide, to a user, recommendations as to which components should be replaced and/or upgraded based on the device mapping. At act 528, the process 500 ends.

As discussed above with respect to act 320, analysis is performed by the computing device 116 on operational data to determine a strength of tested connections based on power, temperature, cooling, communications, or other relationships. In various examples, the strength of the tested connections is determined based on a statistical significance of the tested connections. Determining the statistical significance of the tested connections may be evaluated by analyzing micro variations in short-term time-series data, macro system changes in long-term data integrations, and event data including anomalies and semi-synchronized alarms, to determine a statistical probability that devices are related. Example statistical analysis methods include a correlation coefficient technique, a restricted regression optimization technique, a Bayesian network estimation technique, and an ordinary least squares (OLS) technique, each of which is discussed in turn below.

A correlation coefficient technique will now be described in greater detail. The correlation coefficient technique includes the determination of a correlation coefficient for two tested connections, where the correlation coefficient indicates a likelihood that the two tested connections are related. Two time series are defined, $X_i[t]$ and $X_j[t]$, where $t=1, 2, 3 \ldots, n$. Each of the time series is drawn from the pre-processed data generated at act 106 and represents a series of data points corresponding to a device. t corresponds to a polling period selected as a result of the re-sampling and interpolation discussed above with respect to act 106.

A correlation coefficient between $X_i[t]$ and $X_j[t]$ is defined as, $$CC_{ij}[\tau] = \frac{1}{\sigma_i \sigma_j (n-2\tau)} \sum_{k=1}^{n-\tau} (X_i[t] - \bar{X}_i)(X_j[t+\tau] - \bar{X}_j) \quad (1)$$

where $CC_{ij}[\tau]$ represents a correlation coefficient between devices i and j, $\tau$ represents the lag at which to compute the correlation, and $\sigma_i$ and $\sigma_j$ represent a standard deviation of $X_i$ and $X_j$, respectively. Next, let the maximum value of $CC_{ij}[\tau]$ over $\tau$ be represented as, $$s_{ij} = \max_\tau |CC_{ij}[\tau]| \quad (2)$$

The maximum value, $s_{ij}$, is used as a statistic to measure a significance of a correlation between devices i and j. To enable the cross correlations to approximately follow a normal distribution, the Fisher transformation is used, represented as, $$FCC_{ij}[\tau] = \frac{1}{2} \log \frac{1 + CC_{ij}[\tau]}{1 - CC_{ij}[\tau]} \quad (3)$$

Subsequent to executing the Fisher transformation, the empirical standard deviation is calculated as, $$\widehat{var}(FCC_{ij})^{1/2} \quad (4)$$

and the scaled value, expressed as, $$z_{ij}^F = s_{ij}^F / \widehat{var}(FCC_{ij})^{1/2} \quad (5)$$

may be expected to behave similar to the maximum of the absolute values of the sequence of standard normal random variables. From Equations (1)-(5), it may be determined that, $$Pr\{z_{ij}^F \le z\} \approx \exp(-2\exp(-a_n(z-b_n))) \quad (6)$$

where $$a_n = \sqrt{2\log(n)} \quad (7)$$

and $$b_n = a_n - (2a_n)^{-1}(\log(\log(n)) + \log(4\pi)) \quad (8)$$

Using the foregoing examples, the p-value for the scaled value $z_{ij}^F$ may be calculated. The p-value represents a rough likelihood that the devices i and j are uncoupled and unrelated based on a set of mathematical assumptions. P-values are calculated for pairings of each device under consideration, and sorted such that $p_1 \le p_2 \le \ldots \le p_m$. The pairings for which p-values are determined may be selected based on a device type. For example, in a system comprising three PDUs and three UPS s (as indicated by operational data received directly or indirectly from the six devices), a user may assume that the PDUs are not connected to each other by a direct power path, and that the UPSs are not connected to each other by a direct power path. Accordingly, p-values may be determined only between the UPSs and the PDUs. In other systems, a user may not want to make this simplifying assumption.

Each p-value $p_i$ is compared to a critical value, q·i/m, where q is a false discovery rate (which may be user-defined or dynamically determined), i is an integer corresponding to a p-value under consideration, and m is an integer corresponding to a total number of p-values. If the p-value $p_i$ is greater than the critical value, it is determined that the pair of devices corresponding to $p_i$ are unrelated. Otherwise, if the p-value $p_i$ is less than the critical value, it is determined that the pair of devices corresponding to $p_i$ are related.

Figure 6:
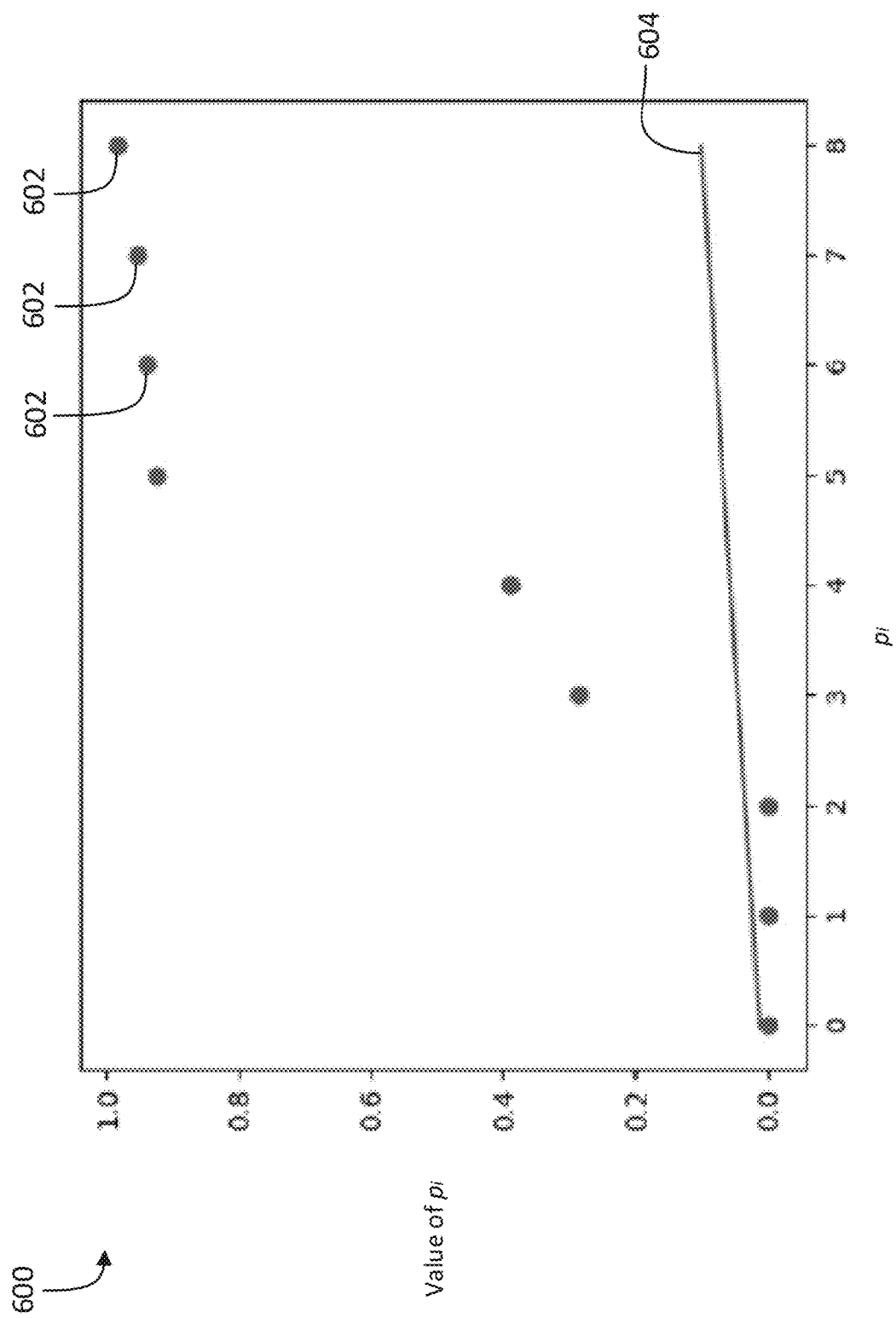
FIG. 6 illustrates a graph of a result of p-value determinations according to an embodiment.

Consider an example in which device relations are determined for a data center, such as the data center 100, including three UPSs and three PDUs (each included in one or more of the cabinets 108, for example). A total of nine p-values may be determined, collectively representing evaluated pairings between each UPS and each PDU. FIG. 6 illustrates a graph 600 of the result of the p-value determinations. Data points 602 represent determined p-values and line 604 represents the critical value above which p-values correspond to unrelated devices. Three of the data points 602 are below the line 604, indicating that there are three pairings of devices which are statistically likely to be related.

Figure 7:
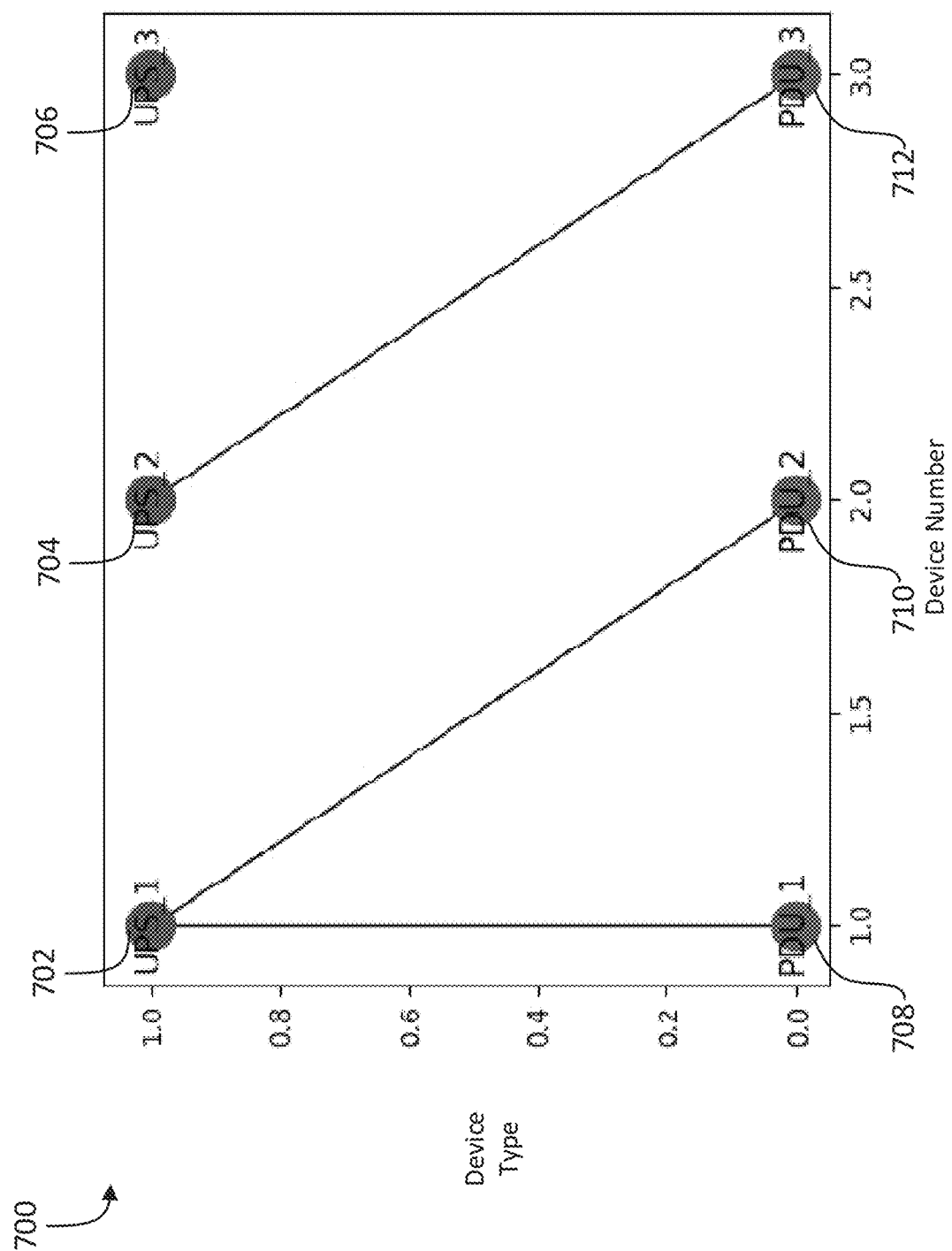
FIG. 7 illustrates a graph of determined likely device relationships according to an embodiment.

FIG. 7 illustrates a graph 700 of the determined likely device relationships. The graph 700 indicates a first point 702 corresponding to a first UPS, a second point 704 corresponding to a second UPS, a third point 706 corresponding to a third UPS, a fourth point 708 corresponding to a first PDU, a fifth point 710 corresponding to a second PDU, and a sixth point 712 corresponding to a third PDU. As illustrated by the lines connecting the first point 702 and the fourth point 708, the first point 702 and the fifth point 710, and the second point 704 and the sixth point 712, a relationship is determined to exist between the first UPS and the first PDU, the first UPS and the second PDU, and the second UPS and the third PDU. For example, the first point 702 may correspond to the UPS 240, and the fourth point 708 may correspond to a PDU included in one of the cabinets 108.

As discussed above, operational data, indicative of parameters such as power, temperature, cooling, communications, or others, may be analyzed to identify relationships between devices. The operational data may be analyzed using one of many implementations. An example of one implementation is provided for purposes of illustration, and includes a restricted regression optimization technique. However, it is to be appreciated that the restricted regression optimization technique is only one example of techniques that may be implemented to analyze operational data indicative of parameters such as power, temperature, cooling, communications, or others, as identified above.

The restricted regression optimization technique is a linear approach to modelling a relationship between a scalar response (or dependent variable) and one or more explanatory variables (or independent variables). Given a data set $\{y_i, x_{i1}, \ldots, x_{ip}\}_{i=1}^n$ of n statistical units, a linear regression model assumes that a relationship between a dependent variable y and a p-vector of regressors x is linear. The relationship is modeled through a disturbance term of error variable ε, an unobserved random variable that adds "noise" to the linear relationship between the dependent variable and the regressors. Accordingly, the model takes the form, $$y_i = \beta_0 1 + \beta_1 x_{i1} + \ldots + \beta_p x_{ip} + \varepsilon_i = X_i^T \beta + \varepsilon_i, i = 1, \ldots, n \quad (9)$$

where T represents the transpose, such that $X_i^T \beta$ is the inner product between vectors $X_i$ and β. In traditional linear regression, the intercept and partial slope coefficients, $\beta_0, \ldots, \beta_p$, are calculated such that the Sum of Squared Errors (SSE) is minimized, where SSE is indicated as, $$\sum_i (y_i - \hat{y}_i)^2 \quad (10)$$

In this method, the intercept is restricted to zero, and the partial slope coefficients are restricted to be either zero or one. These restrictions are based on an assumption that connected devices should have an approximately one-to-one relationship, depending on the sensor measurements of interest. Accordingly, this regression technique may be characterized as a generalized reduced gradient (GRG) nonlinear optimization problem.

An objective of the GRG nonlinear optimization is to minimize a sum of the estimated mean square error (MSE) for each restricted regression problem, where $$MSE = \frac{SSE}{n-2} \quad (11)$$

The variables changing in the GRG nonlinear optimization (i.e., the values being optimized) are the partial slope coefficients $\beta_1, \ldots, \beta_p$, corresponding to each independent variable, or "child," in the data set. The partial slope coefficients are constrained to be either zero or one (i.e., binary), and each independent variable, or child, device is constrained to correspond to only one dependent variable, or ancestor device. An output is provided representing predicted device connections, and may be similar in form to the example provided above with respect to FIG. 7.

A Bayesian network estimation technique will now be discussed in greater detail. A Bayesian network is a probabilistic graphical model, which is a type of statistical model, that represents a set of variables and the variables' conditional dependencies via a directed acyclic graph. Learning a structure of a Bayesian network can be accomplished using one of several methods, including a method which utilizes tests of node independence using a grow-shrink Markov blanket algorithm.

The Markov blanket algorithm is based on two phases, a growing phase and a shrinking phase, during which an estimated Markov blanket is recovered based on pairwise independence. Starting from an empty set S, the growing phase adds variables to S as long as the variables are dependent with X (a one-dimensional variable) given the current contents of S. The premise of the growing phase is to add all variables in a universe U of variables in the domain $\{X_1, \ldots, X_n\}$ to the set S.

However, variables may be added to S that were actually outside of the Markov blanket S. Such variables are those that have been rendered independent from X at a later point when "intermediate" (d-separating) nodes of the underlying Bayesian net were added to S. Accordingly, the shrinking phase is executed subsequent to the growing phase to identify and remove these variables. The Markov blanket algorithm may be expressed mathematically as four steps, with step two representing a growing phase and step three representing a shrinking phase:

---
1. $S \leftarrow 0$
2. While $\exists Y \in U - \{X\}$ such that $Y \perp X|S$, do $S \leftarrow S \cup \{Y\}$
3. While $\exists Y \in S$ such that $Y \perp X|S - \{Y\}$, do $S \leftarrow S - \{Y\}$
4. $B(X) \leftarrow S$
---

The Markov blanket algorithm may be trained with known device connections during a training period prior to implementation. A length of the training period may be user-configured or dynamically determined. For example, the training period may continue until the algorithm is capable of predicting device connections above a threshold accuracy based on the training data. The accuracy of the Markov blanket algorithm increases in proportion to a length of the training period, such that a longer training period corresponds to a more-accurate algorithm. After the training period, the algorithm is executed to provide an output representing predicted device connections, which may be similar in form to the example provided above with respect to FIG. 7.

An OLS regression technique will now be described in greater detail. The OLS regression technique is similar to the restricted regression optimization technique, in that it is a linear approach to modelling a relationship between a scalar response (or dependent variable) and one or more explanatory variables (or independent variables).

In one example, an OLS modeling is applied that is unique in that only one possible connection between devices is considered at a time (e.g., one UPS to one PDU), rather than considering all of the possible child devices associated with one "parent" device. Considering only one possible device connection at a time is beneficial in that it may reduce the effect multicollinearity on the estimated values of the parameters ($\beta$) and their associated levels of significance (p-value). In an application in which power paths are detected in data centers, there is the potential for devices to be carrying out similar jobs, causing the devices' overall power demand to be quite similar. In this case, trying to model the relationship between correlated device timeseries and one potential parent could lead to inconsistent results of parameter estimates and significance levels. Therefore, the first stage of the model takes the form, $$y_i = \beta_0 1 + \beta_1 x_{i1} + \varepsilon_i, \quad (12)$$
$$i = 1, \ldots, n$$

In this method, the intercept is not restricted to zero, and the partial slope coefficients are not restricted to be either zero or one. Instead, the intercept and partial slope coefficients, $\beta_0$, $\beta_1$, are calculated such that the SSE is minimized.

In addition to modeling one potential explanatory child device ($\beta_1 x_{i1}$) in a given iteration, time factors may also be incorporated to combat the presence of seasonality in the data. It is possible that there exist trends in the power demand of a device due to the time of day or day of the week that are under consideration (e.g., increased power demand during typical working hours). This possible similarity in power demand across multiple unrelated devices could lead to falsely predicted connections. In order to account for this, time factors for hour and day may be included in the OLS model, now taking the form, $$y_t = \beta_0 + \beta_1 x_t + \sum_{i=1}^{23} \omega_i I\{t \text{ is in } i_{th} \text{ hour}\} + \sum_{j=1}^{6} \theta_j I\{t \text{ is in } j_{th} \text{ day}\} + \varepsilon_t, \quad (13)$$
$$t = 1, \ldots, n; i = 1, \ldots, 23; j = 1, \ldots, 6$$

where $\omega_i$ is the estimated partial slope coefficient associated with hour, $\theta_j$ is the estimated partial slope coefficient associated with day, and I{event}=1 if event happens and I{event}=0 if event does not happen.

The variables changing in the OLS regression (i.e., the values being optimized) are the intercept $\beta_0$, partial slope coefficient corresponding to the independent variable, or child, being considered in the data set, and the time factor coefficients, $\omega_i$ and $\theta_j$. The main estimate of interest is the partial slope coefficient corresponding to the independent variable, or child, being considered in the data set. The outputted estimates of these values for each possible device pairing are compared and ranked according to significance level (p-value). An output is provided representing predicted device connections (according to highest significance level), and may be similar in form to the example provided above with respect to FIG. 7.

Certain examples provided above have been illustrated with respect to UPSs and PDUs. The principles disclosed herein are not limited to UPSs and PDUs, which have been provided for purposes of explanation only. The principles disclosed herein are also applicable to power devices generally (including, for example, UPSs, PDUs, transformers, rPDUs, and so forth), heating and cooling systems, communications devices, and so forth.

As discussed above, device relationships may be based on a power path, temperature, cooling, a communications path, or other properties. Various examples provided above have been given with respect to a power path. Device relationships based on temperature may refer to a system of devices in which a temperature of a first device in the system is related to a temperature of a second device in the system. For example, where the first device is proximate to the second device, heat generated by the first device may be transferred to the second device. Referring to FIG. 1, a first one of the cabinets 108 adjacent to a second one of the cabinets 108 may be sufficiently proximate as to exchange an appreciable amount of heat. Each of the cabinets 108 may include one or more temperature sensors configured to capture temperature information and provide the temperature information to the computing device 116, based upon which the computing device 116 may execute one of the processes 300-500 discussed above.

In another example, a system of devices may be cooled by a cooling system. For example, the cabinets 108 may be cooled by the cooling devices 104. To operate the cooling system efficiently, it may be beneficial to understand temperature and cooling zones in a volume of space. For example, understanding temperature and cooling zones may include understanding what effect cooling a first device has on cooling a second device in addition to understanding how heat is transferred between the devices. Accordingly, understanding cooling and temperature relationships may enable a cooling system to operate more efficiently. The cooling system may automatically execute certain functions based on the temperature relationships. For example, the cooling system may modify a temperature, velocity, or direction of cooled air provided by the cooling system. Accordingly, in some examples, the computing device 116 may determine a cooling relationship between the cabinets 108 and provide information indicative of the relationship to the cooling devices 104. The cooling devices 104, in turn, may be configured to modify the parameters discussed above to provide more efficient cooling.

Device relationships based on communications paths may refer to a system of devices in which a first device communicates with a second device. For example, communications sent by a first device may be routed through a second device to be delivered to a third device, or a first device may repeatedly communicate with a second device. Referring to FIG. 2, for example, devices in the rack 200 (for example, the UPSs 240, rPDUs 210, and so forth) may communicate information, such as operational data, to the computing device 116 via a communications interface in the rack 200. Understanding communications relationships may enable a system to operate more efficiently, such as by detecting a loss of communications functionality by a device. For example, if a group of devices which typically route communications through a routing device detect an inability to send communications at approximately the same time, it may be determined that the routing device is not functioning properly. Furthermore, alarms sent by the group of devices may be consolidated into a single alert indicating that the routing device is not functioning properly.

As discussed above, various aspects and functions described herein may be executed in connection with one or more computer systems, such as the computing device 116. For example, aspects and functions described herein may be included as specialized hardware or software components executing in one or more computer systems. One or more acts of the method described above may be performed with a computer such as the computing device 116, where at least one act is performed in a software program housed in a computer. Non-limiting examples of computer systems include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 8:
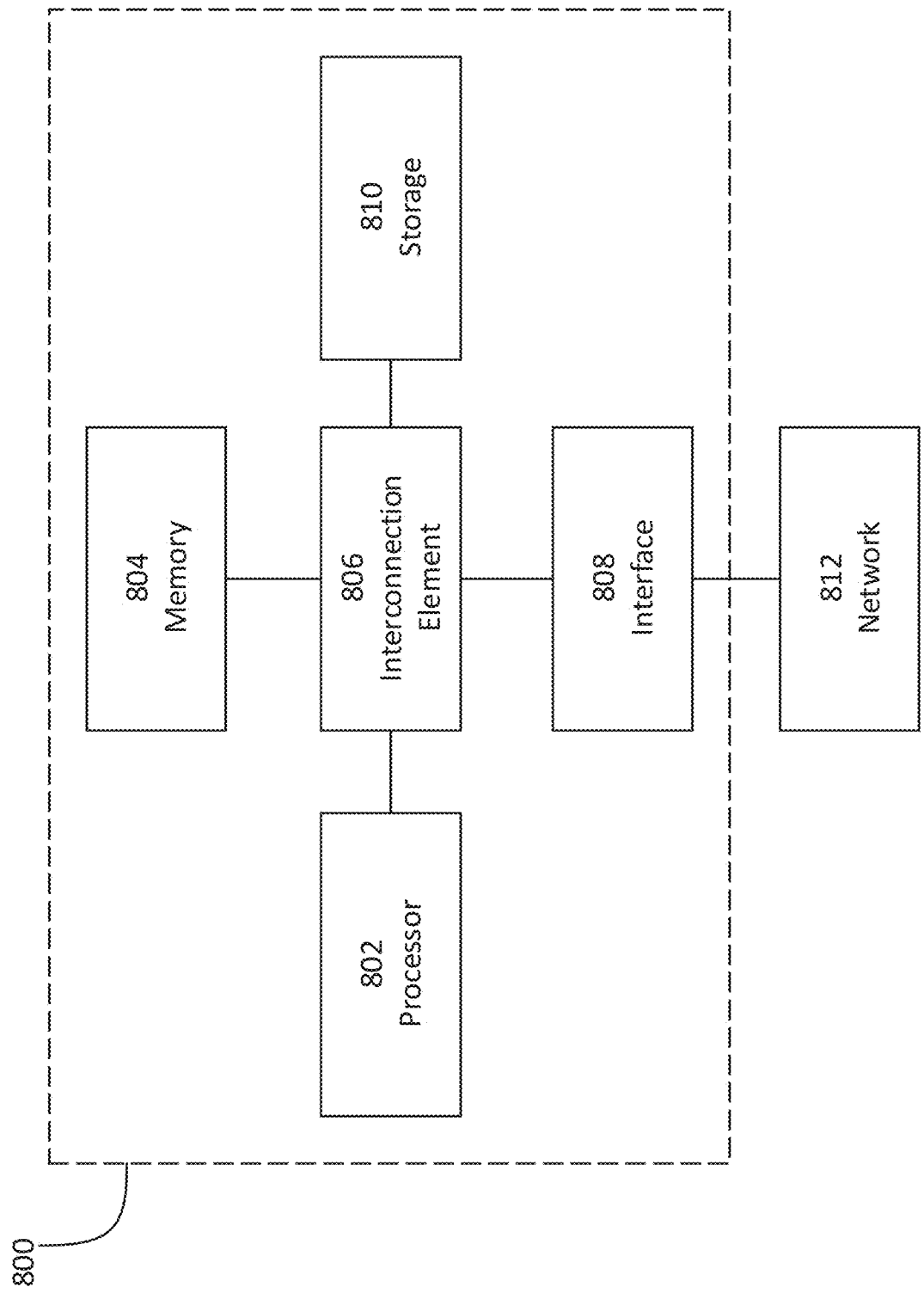
FIG. 8 illustrates a block diagram of a computer system according to an embodiment.

FIG. 8 illustrates a block diagram of a computer system 800, in which various aspects and functions are practiced. As discussed above, the computer system 800 may be an example of the computing device 116. As shown, the computer system 800 includes a processor 802, one or more memory elements 804, an interconnection element 806, one or more interface devices 808 coupled to a communication network 812, and a data storage element 810. As shown, the computer system 800 is connected to, and may exchange data through, the communication network 812. For example, data may be exchanged between the computing device 116 and the cabinets 108 and cooling devices 104 via the communication network 812. The communication network 812 may include any communication network through which computer systems may exchange data. To exchange data using the communication network 812, the computer system 800 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer system 800 may transmit data via the communication network 812 using a variety of security measures including, for example, TLS, SSL or VPN.

The computer system 800 may be configured to exchange information with one or more devices. For example, and as discussed above with respect to act 304, the computer system 800 may be configured to receive operational data (for example, current data or voltage data) from one or more sensors coupled to one or more devices in the data center 100. Accordingly, the computer system 800 may be configured to communicate with networked devices via the communication network 812.

To implement at least some of the aspects, functions and processes disclosed herein, the processor 802 performs a series of instructions that result in manipulated data. The processor 802 may be any type of processor, multiprocessor or controller. Some example processors include commercially available processors such as an Intel Atom, Itanium, Core, Celeron, or Pentium processor, an AMD Opteron processor, an Apple A4 or A5 processor, a Sun UltraSPARC or IBM Power5+ processor and an IBM mainframe chip. The processor 802 is connected to other system components, including the one or more memory elements 804, by the interconnection element 806.

The one or more memory elements 804 store programs and data during operation of the computer system 800. Thus, the one or more memory elements 804 may be relatively high performance, volatile, random access memory such as dynamic random-access memory (DRAM) or static random-access memory (SRAM). However, the one or more memory elements 804 may include any device for storing data, such as a disk drive or other nonvolatile storage device. Various examples may organize the one or more memory elements 804 into particularized and, in some cases, unique structures to perform the functions disclosed herein. These data structures may be sized and organized to store values for particular data and types of data.

Components of the computer system 800 are coupled by an interconnection element such as the interconnection element 806. The interconnection element 806 may include one or more physical busses, for example, busses between components that are integrated within a same machine, but may include any communication coupling between system elements including specialized or standard computing bus technologies such as IDE, SCSI, PCI and InfiniBand. The interconnection element 806 enables communications, such as data and instructions, to be exchanged between system components of the computer system 800.

The computer system 800 also includes the one or more interface devices 808 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, and so forth. Interface devices allow the computer system 800 to exchange information and to communicate with external entities, such as users and other systems.

The data storage element 810 includes a computer readable and writeable nonvolatile, or non-transitory, data storage medium in which instructions are stored that define a program or other object that is executed by the processor 802. The data storage element 810 also may include information that is recorded, on or in, the medium, and that is processed by the processor 802 during execution of the program. More specifically, the information may be stored in one or more data structures specifically configured to conserve storage space or increase data exchange performance. The instructions may be persistently stored as encoded signals, and the instructions may cause the processor 802 to perform any of the functions described herein. The medium may, for example, be optical disk, magnetic disk or flash memory, among others. In operation, the processor 802 or some other controller causes data to be read from the nonvolatile recording medium into other memory, such as the one or more memory elements 804, that allows for faster access to the information by the processor 802 than does the storage medium included in the data storage element 810. The memory may be located in the data storage element 810 or in the one or more memory elements 804, however, the processor 802 manipulates the data within the memory, and then copies the data to the storage medium associated with the data storage element 810 after processing is completed. A variety of components may manage data movement between the storage medium and other memory elements and examples are not limited to particular data management components. Further, examples are not limited to a particular memory system or data storage system.

Although the computer system 800 is shown by way of example as one type of computer system upon which various aspects and functions may be practiced, aspects and functions are not limited to being implemented on the computer system 800. Various aspects and functions may be practiced on one or more computers having a different architectures or components than that shown in FIG. 8. For instance, the computer system 800 may include specially programmed, special-purpose hardware, such as an application-specific integrated circuit (ASIC) tailored to perform a particular operation disclosed herein. While another example may perform the same function using a grid of several computing devices running MAC OS X with IBM PowerPC processors and several specialized computing devices running proprietary hardware and operating systems.

The computer system 800 may be a computer system including an operating system that manages at least a portion of the hardware elements included in the computer system 800. In some examples, a processor or controller, such as the processor 802, executes an operating system. Examples of a particular operating system that may be executed include a Windows-based operating system, such as the Windows 10 operating system, available from the Microsoft Corporation, a MAC OS X operating system or an iOS operating system available from Apple Computer, one of many Linux-based operating system distributions, for example, the Enterprise Linux operating system available from Red Hat Inc., a Solaris operating system available from Oracle, or a UNIX operating systems available from various sources. Many other operating systems may be used, and examples are not limited to any particular operating system.

The processor 802 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++ or Python. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Alternatively, one or more computing devices executing the processes discussed herein may automatically execute one or more actions. Although the foregoing examples are directed to alarm consolidation, in other embodiments, a computing device executing the processes above may perform other functions. For example, a computing device may determine that a load does not have access to sufficient redundant uninterruptible power and, in response thereto, instruct a user to add additional redundant power supplies, or automatically redirect uninterruptible power to provide sufficient redundant power.

At least one embodiment discussed above provides automatic generation of data-center network mapping using power path, cooling or temperature zone, or communications path operational data. In other embodiments, systems and methods described herein provide automatic generation of a data-center network mapping for automated alarm consolidation using power path, cooling or temperature zone, or communications path operational data. Current systems do not provide automatic generation of data-center network mapping using power path, cooling or temperature zone, or communications path operational data or automatic generation of a data-center network mapping for automated alarm consolidation using power path, cooling or temperature zone, or communications path operational data. Developing a system for generating this mapping automatically and for generating this mapping for automated alarm consolidation is a technical problem. An exemplary embodiment of a system having a plurality of interrelated devices may receive, from each device of the plurality of interrelated devices, operational data indicative of at least one of a power path, cooling or temperature zones, or communications paths. The system may determine, based on the operational data, a statistical probability of a connection between two or more devices. The system may generate, based on the operational data, a device mapping indicative of at least one predicted connection and provide the mapping to a user. At least this foregoing combination of features comprises a system architecture that serves as a technical solution to the foregoing technical problem. This technical solution is not routine, is unconventional, and is not well understood in the field of IT-equipment mapping. This technical solution is a practical application of the exemplary system for automatic generation of data-center network mapping and automatic generation of data-center network mapping for automated alarm consolidation that solves the foregoing technical problem and constitutes an improvement in the technical field of IT-equipment mapping at least by facilitating faster, more efficient, and more accurate mapping and/or faster, more efficient, and more accurate alarm consolidation.

It is to be appreciated that certain acts discussed above with respect to FIG. 3 may be optional. That is, certain acts of the process 300 may or may not be executed in certain examples. For example, acts 306-320, 324, and 330-334 may be optionally executed in certain examples.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for automatically generating a data-center network mapping, the system comprising:
    a plurality of interrelated devices; and
    at least one computing device communicatively coupled to each device of the plurality of interrelated devices, the at least one computing device being configured to:
        receive operational data from each device of the plurality of interrelated devices, the operational data being indicative of at least one of a power path, cooling or temperature zones, or communications paths;
        determine, based on the operational data, device relationships between each device of the plurality of interrelated devices;
        determine, based on the operational data, that a first device of the plurality of interrelated devices is a first device type and that a second device of the plurality of interrelated devices is a second device type; and
        determine, based on determining that the first device is a first device type and that the second device is a second device type, that the first device is related or unrelated to the first device type.

2. The system of claim 1, wherein the at least one computing device is further configured, in determining the device relationships, to standardize the operational data with respect to a single polling frequency.

3. The system of claim 2, wherein the at least one computing device is further configured, in standardizing the operational data with respect to the single polling frequency, to round data measurements to a nearest period of the single polling frequency.

4. The system of claim 3, wherein the at least one computing device is further configured to interpolate data measurements for each period of the single polling frequency for which no data measurement exists.

5. The system of claim 2, wherein the at least one computing device is further configured to interpolate data measurements for each period of the single polling frequency for which no data measurement exists.

6. The system of claim 1, wherein the at least one computing device is further configured, in determining the device relationships, to execute at least one of a Bayesian network estimation technique, a correlation coefficient technique, a restricted regression optimization technique, or an ordinary least squares technique to generate a device mapping indicative of relationships between each device of the plurality of interrelated devices.

7. The system of claim 1, wherein the plurality of interrelated devices includes a power device, and wherein the operational data includes at least one of:
    current data representing a current provided by the power device, power data representing a power provided by the power device, or voltage data representing a voltage provided by the power device; or
    temperature data representing an ambient temperature of the power device provided by the power device.

8. The system of claim 1, wherein the at least one computing device is further configured to determine, based on the device relationships, at least one of a device health or a device reliability of at least one interrelated device of the plurality of interrelated devices.

9. The system of claim 1, wherein the at least one computing device is configured to determine that the first device is unrelated to the second device responsive to determining that the first device type is the same as the second device type.

10. The system of claim 9, wherein the first device type and the second device type are each an uninterruptible power supply.

11. The system of claim 1, wherein determining that the first device is unrelated to the second device includes determining that the first device does not provide power to, or receive power from, the second device.

12. A non-transitory computer-readable medium storing thereon sequences of computer-executable instructions for automatically generating a data-center network mapping for a plurality of interrelated devices, the sequences of computer-executable instructions including instructions that instruct at least one processor to:
   receive operational data from each device of the plurality of interrelated devices, the operational data being indicative of at least one of a power path, cooling or temperature zones, or communications paths;
   determine, based on the operational data, device relationships between each device of the plurality of interrelated devices;
   determine, based on the operational data, that a first device of the plurality of interrelated devices is a first device type and that a second device of the plurality of interrelated devices is a second device type; and
   determine, based on determining that the first device is a first device type and that the second device is a second device type, that the first device is related or unrelated to the first device type.

13. The non-transitory computer-readable medium of claim 12, wherein the at least one processor is further configured, in determining the device relationships, to standardize the operational data with respect to a single polling frequency.

14. The non-transitory computer-readable medium of claim 13, wherein the at least one processor is further configured, in standardizing the operational data with respect to the single polling frequency, to round data measurements to a nearest period of the single polling frequency.

15. The non-transitory computer-readable medium of claim 14, wherein the at least one processor is further configured to interpolate data measurements for each period of the single polling frequency for which no data measurement exists.

16. The non-transitory computer-readable medium of claim 13, wherein the at least one processor is further configured to interpolate data measurements for each period of the single polling frequency for which no data measurement exists.

17. The non-transitory computer-readable medium of claim 12, wherein the at least one processor is further configured, in determining the device relationships, to execute at least one of a Bayesian network estimation technique, a correlation coefficient technique, a restricted regression optimization technique, or an ordinary least squares technique to generate a device mapping indicative of relationships between each device of the plurality of interrelated devices.

18. The non-transitory computer-readable medium of claim 12, wherein the plurality of interrelated devices includes a power device, and wherein the operational data includes at least one of:
   current data representing a current provided by the power device, power data representing a power provided by the power device, or voltage data representing a voltage provided by the power device; or
   temperature data representing an ambient temperature of the power device provided by the power device.

19. A method of automatically generating a data-center network mapping for a plurality of interrelated devices, the method comprising:
   receiving operational data from each device of the plurality of interrelated devices, the operational data being indicative of at least one of a power path, cooling or temperature zones, or communications paths;
   determining, based on the operational data, device relationships between each device of the plurality of interrelated devices;
   determining, based on the operational data, that a first device of the plurality of interrelated devices is a first device type and that a second device of the plurality of interrelated devices is a second device type; and
   determining, based on determining that the first device is a first device type and that the second device is a second device type, that the first device is related or unrelated to the first device type.

20. The non-transitory computer-readable medium of claim 12, wherein the at least one processor is configured to determine that the first device is unrelated to the second device responsive to determining that the first device type is the same as the second device type.

* * * * *